| (12) | United States Patent<br>Kozaki | (10) Patent No.: US 10,487,875 B2<br>(45) Date of Patent: Nov. 26, 2019 |

(54) MAGNETIC BEARING DEVICE

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 284 days.

(21) Appl. No.: 15/686,790

(22) Filed: Aug. 25, 2017

(65) Prior Publication Data

US 2019/0063494 A1 Feb. 28, 2019

(51) Int. Cl.
*F16C 32/04* (2006.01)
*H02K 7/09* (2006.01)

(52) U.S. Cl.
CPC ...... *F16C 32/0455* (2013.01); *F16C 32/0448* (2013.01); *F16C 32/0491* (2013.01); *H02K 7/09* (2013.01); *F16C 2360/45* (2013.01)

(58) Field of Classification Search
CPC ... H02K 7/09; F16C 32/0448; F16C 32/0455; F16C 32/0491
USPC .................................................. 310/90, 90.5
See application file for complete search history.

(56) References Cited

U.S. PATENT DOCUMENTS

| 6,604,918 | B2 * | 8/2003 | Komoriya | F04D 19/048<br>417/423.4 |
| 9,624,974 | B2 | 4/2017 | Kozaki et al. | |
| 2002/0047400 | A1 * | 4/2002 | Ueyama | H02K 7/09<br>310/90.5 |
| 2007/0069598 | A1 * | 3/2007 | Kozaki | G05B 5/01<br>310/90.5 |
| 2013/0147296 | A1 * | 6/2013 | Kozaki | H02K 7/09<br>310/90.5 |
| 2014/0212312 | A1 * | 7/2014 | Kozaki | F04D 29/058<br>417/423.12 |
| 2014/0219841 | A1 * | 8/2014 | Kozaki | F04D 19/042<br>417/423.12 |
| 2014/0360006 | A1 * | 12/2014 | Zhang | F04D 29/058<br>29/593 |
| 2014/0377106 | A1 * | 12/2014 | Kozaki | F04D 19/042<br>417/423.12 |
| 2015/0050170 | A1 * | 2/2015 | Kozaki | F16C 32/0489<br>417/423.12 |
| 2015/0211575 | A1 * | 7/2015 | Kim | F16C 32/0461<br>310/90.5 |

FOREIGN PATENT DOCUMENTS

| JP | 2009-275740 | 11/2009 |
| JP | 2014-137116 | 7/2014 |

* cited by examiner

*Primary Examiner* — Gary A Nash
(74) *Attorney, Agent, or Firm* — Renner, Otto, Boisselle & Sklar, LLP

(57) ABSTRACT

When a duration of current noise caused by a PWM control of each excitation amplifier is Td, a cycle of a PWM carrier signal is Tpwm, an on-duty upper limit of the PWM carrier signal under quiet environment without disturbance is Tonu, and an on-duty lower limit of the PWM carrier signal under the quiet environment without the disturbance is Tonl, the AD sampling period includes a first AD sampling period between a point after a lapse of the time Td after a start of the cycle Tpwm and a point after a lapse of a time (Tpwm−Tonu) from the start of the cycle Tpwm, and a second AD sampling period between a point after a lapse of a time (Tpwm−Tonl+Td) from the start of the cycle Tpwm and an end point of the cycle Tpwm.

8 Claims, 17 Drawing Sheets

MAGNETIC BEARING DEVICE

BACKGROUND OF THE INVENTION

1. Technical Field

The present invention relates to a magnetic bearing device.

2. Background Art

In a device configured such that a rotor body is non-contact supported by a magnetic bearing device, such as a magnetic bearing turbo-molecular pump, magnetic suction power of an electromagnet (i.e., electromagnet current) is, for levitating a rotor to a predetermined target position, controlled in real time based on a deviation (a displacement) between a rotor levitation position and the target position. For rotor displacement detection, there are a detection method using a special displacement sensor and a sensorless method (also called a "self-sensing method") not using a displacement sensor. In the sensorless method, an electromagnet has both of a typical actuator function (generation of magnetic levitation suction power) and a sensing function.

In any of these methods, an inductance method is employed for the sensing function. A high-frequency carrier (a sensor carrier) is applied to a sensor coil or an electromagnet coil, and the amplitude of the sensor carrier is modulated according to an inductance change due to a levitation gap. The resultant is demodulated, and as a result, a levitation gap signal (a displacement signal) is obtained. For demodulation processing, a method in which by application of a digital technique, synchronous sampling is performed for a modulated wave signal and the resultant signal is taken by an AD converter, i.e., a direct method not requiring smoothing processing leading to occurrence of a delay, has been known.

On the other hand, for the actuator function for generating the magnetic suction power, it is configured such that a switching voltage is applied from a PWM amplifier to the electromagnet coil to supply an excitation current. Specifically in the case of the sensorless method, the electromagnet has not only the actuator function but also the sensing function, and levitation position information (displacement information) of the rotor body is obtained by detection of the electromagnet current. The PWM amplifier is driven with voltage. For controlling an excitation current value, the control of feeding back the value of current flowing through the electromagnet after detection thereof is required.

In the case of the PWM amplifier, spike-shaped noise due to, e.g., surge voltage is caused in the electromagnet current at switching timing, leading to a problem that the noise is superimposed on a detected current signal. Moreover, such spike-shaped noise is also superimposed on a detected current signal or displacement signal for other axes via ground line current.

In a case where the spike-shaped noise is superimposed on the displacement signal or the current signal, a filter is applied to perform noise reduction processing. However, this leads to trade-off between a noise reduction effect and lowering of control stability due to a signal time delay. For this reason, filtering processing cannot be easily performed. When noise is superimposed on a levitation control signal due to insufficient noise reduction processing, such noise is converted into vibration force at the electromagnet, leading to occurrence of great vibration.

For these reasons, in a technique described in JP-A-2014-137116, countermeasures are taken, in which there is a limitation on a variable duty range in PWM control of an excitation amplifier. That is, the duty range is limited for ensuring a time until transient spike noise caused after switching is reduced. Thus, PWM control is performed such that the length of an on-duty zone (or an off-duty zone) of a PWM carrier signal is constantly longer than a predetermined duration based on attenuation properties of the spike noise caused in electromagnet current. Then, a current detection signal is, by AD sampling, taken by an AD converter at timing after a lapse of the predetermined duration from the start timing of the on-duty zone (or the off-duty zone).

Further, the frequency fpwm of the PWM carrier signal, the frequency fc of a sensor carrier signal, and the frequency fs in AD sampling are set to an integral multiple relationship. With such settings, current detection signals and sum signals (detection signals corresponding to a displacement) of electromagnets for multiple axes are simultaneously and collectively AD-sampled.

However, in the technique described in JP-A-2014-137116, an AD converter employing the method for collectively taking multiple signals is required, and there is a probability that the variable duty range in PWM control is limited more than necessary.

SUMMARY OF THE INVENTION

A magnetic bearing device comprises: a pair of electromagnets provided for each of multiple control axes and arranged to face each other with respect to a rotor shaft; a plurality of excitation amplifiers configured to supply an electromagnet current to each electromagnet; a plurality of current sensors each configured to detect the electromagnet current to output a current detection signal; and a controller configured to AD-sample (i) the current detection signal based on the electromagnet current on which a carrier signal for detecting a change in a levitation position of the rotor shaft is superimposed, and a sum signal of the current detection signals of the pair of electromagnets, or (ii) the current detection signal, and a modulated signal produced by modulating a carrier signal based on the levitation position, in a predetermined AD sampling period to obtain displacement information on the levitation position change, thereby performing PWM control of each excitation amplifier based on the displacement information. When a duration of current noise caused by the PWM control of each excitation amplifier is Td, a cycle of a PWM carrier signal is Tpwm, an on-duty upper limit of the PWM carrier signal under quiet environment without disturbance is Tonu, and an on-duty lower limit of the PWM carrier signal under the quiet environment without the disturbance is Tonl, the AD sampling period includes a first AD sampling period between a point after a lapse of the time Td after a start of the cycle Tpwm and a point after a lapse of a time (Tpwm−Tonu) from the start of the cycle Tpwm, and a second AD sampling period between a point after a lapse of a time (Tpwm−Tonl+Td) from the start of the cycle Tpwm and an end point of the cycle Tpwm.

The magnetic bearing device further comprises a carrier generator configured to generate the carrier signal for detecting the change in the levitation position of the rotor shaft; and a displacement sensor configured to modulate the carrier signal based on the levitation position change to output the modulated signal. The controller AD-samples each current detection signal and the modulated signal in the predetermined AD sampling period to obtain displacement information on the levitation position change, thereby performing PWM control of each excitation amplifier based on the displacement information.

The plurality of excitation amplifiers supply, to each electromagnet, the electromagnet current on which the carrier signal for detecting the change in the levitation position of the rotor shaft is superimposed. The magnetic bearing device further comprising a sum signal obtainer configured to add up the current detection signals of the pair of electromagnets to obtain the sum signal. The controller AD-samples each current detection signal and the sum signal in the predetermined AD sampling period to obtain displacement information on the levitation position change, thereby performing PWM control of each excitation amplifier based on the displacement information.

When a minimum intake time in AD sampling is Tmin, the first AD sampling period is set to a period between the point after the lapse of the time Td from the start of the cycle Tpwm and a point after a lapse of a time (Td+Tmin) from the start of the cycle Tpwm, and the second AD sampling period is set to a period between a point after a lapse of a time (Tpwm−Tmin) from the start of the cycle Tpwm and the end point of the cycle Tpwm.

The first AD sampling period is set to a period between a point after a lapse of 10% of the cycle Tpwm from the start of the cycle Tpwm and a point after a lapse of 40% of the cycle Tpwm from the start of the cycle Tpwm, and the second AD sampling period is set to a period between a point after a lapse of 70% of the cycle Tpwm from the start of the cycle Tpwm and a point after a lapse of 90% of the cycle Tpwm from the start of the cycle Tpwm.

When a frequency of the PWM carrier signal is fpwm, a frequency of the carrier signal is fc, and a frequency in the AD sampling is fs, the fpwm, the fc, and the fs satisfy fpwm=M·fs=N·fc in relation to integers M, and satisfying N≥M>1, and sampling timing for performing the AD sampling is set at every time interval Tsnpl being equal to or shorter than the time (Td+Tmin) and satisfying Tpwm=L·Tsnpl in relation to an integer L.

The magnetic bearing device further comprises: an obtainer configured to obtain such a frequency that an on-duty duration in the PWM carrier signal is equal to or shorter than (Td+Tmin) or equal to or longer than (Tpwm−Td−Tmin); and a warner configured to emit a warning when the frequency exceeds a predetermined frequency threshold.

The magnetic bearing device further comprises: a holder configured to hold multiple different frequency thresholds. Any of the multiple frequency thresholds is alternatively set.

According to the present invention, the AD converter employing the method for collectively taking the multiple signals is not necessary for AD sampling, and there is no probability that the variable duty range in PWM control is limited more than necessary.

DETAILED DESCRIPTION OF THE EXEMPLARY EMBODIMENTS

Hereinafter, embodiments of the present invention will be described with reference to the drawings.

First Embodiment

Figure 1:
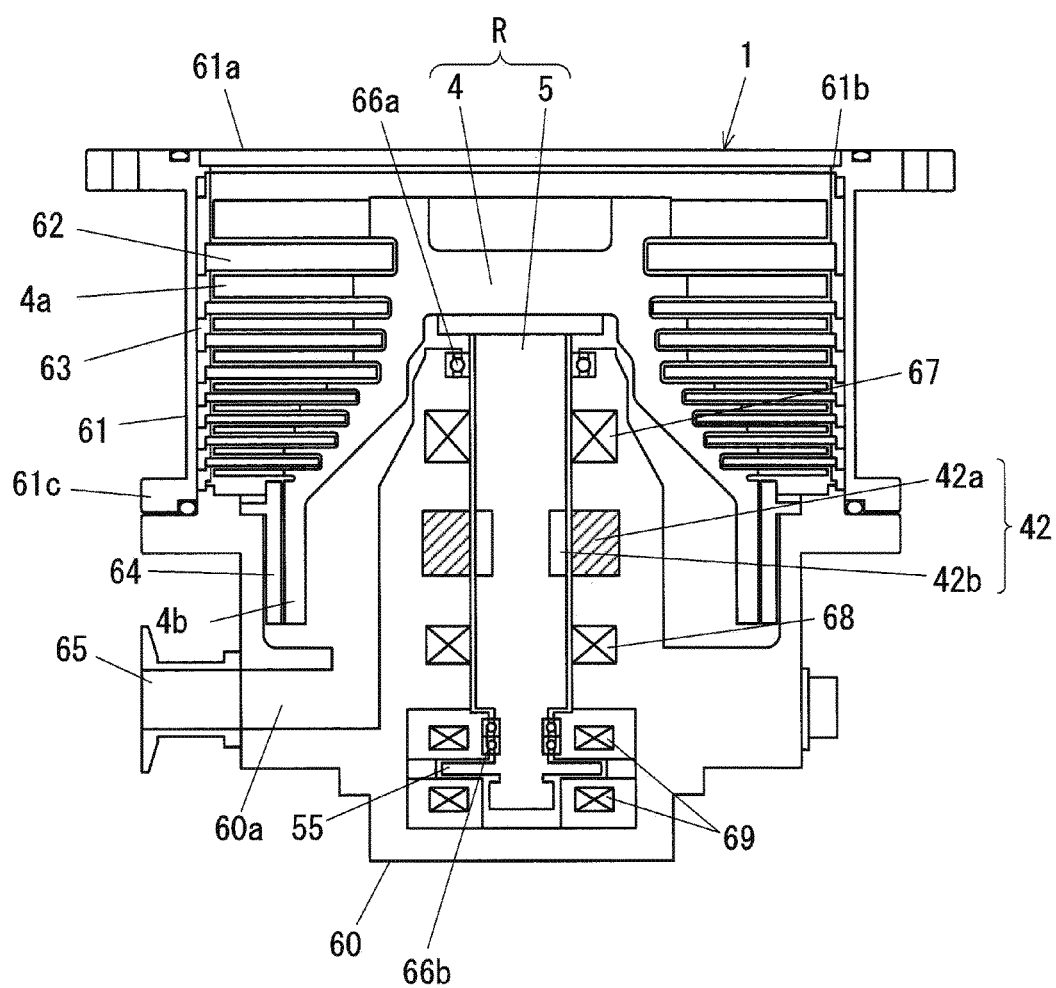
FIG. 1 is a sectional view of an outline configuration of a magnetic bearing turbo-molecular pump.

FIG. 1 is a sectional view of an outline configuration of a turbo-molecular pump to which a magnetic bearing device of a first embodiment of the present invention is applied. The turbo-molecular pump includes a pump main body 1 illustrated in FIG. 1, and a control unit (not shown) configured to drive the pump main body 1.

The pump main body 1 includes a turbo pump stage having rotor blades 4a and stationary blades 62, and a drag pump stage (a screw groove pump) having a cylindrical portion 4b and a screw stator 64. In the present embodiment, a screw groove is formed at the screw stator 64, but may be formed at the cylindrical portion 4b.

The rotor blades 4a and the cylindrical portion 4b are formed at a pump rotor 4. The pump rotor 4 is fastened to a shaft 5. The pump rotor 4 and the shaft 5 form a rotor unit R. The stationary blades 62 and the rotor blades 4a are alternately arranged in an axial direction. Each stationary blade 62 is placed on a base 60 with a spacer ring 63 being interposed therebetween. When a fixing flange 61c of a pump case 61 is fixed to the base 60 with bolts, a stack of spacer rings 63 is sandwiched between the base 60 and a locking portion 61b of the pump case 61, and therefore, the position of each stationary blade 62 is determined.

The shaft 5 is non-contact supported by magnetic bearings 67, 68, 69. The magnetic bearings 67, 68, 69 form a five-axis magnetic bearing. Electromagnets forming the magnetic bearing 69 are arranged to sandwich a rotor disc 55 in the axial direction, the rotor disc 55 being configured to rotate together with the shaft 5. As described later, the magnetic bearings 67, 68, 69 are self-sensing magnetic bearings configured to estimate a change in a levitation position based on electromagnet current on which a sensor carrier component is superimposed.

A motor 42 is a synchronous motor, and in the present embodiment, a DC brushless motor is used. The motor 42 has a motor stator 42a disposed at the base 60, and a motor rotor 42b provided at the shaft 5. A permanent magnet is provided at the motor rotor 42b. When no magnetic bearings are in operation, the shaft 5 is supported by emergency mechanical bearings 66a, 66b.

An exhaust port 65 is provided at an exhaust port 60a of the base 60, and a back pump is connected to the exhaust port 65. The rotor unit R is magnetically levitated while being rotatably driven at high speed by the motor 42, and in this manner, gas molecules are exhausted from a suction port 61a to the exhaust port 65.

Figure 2:
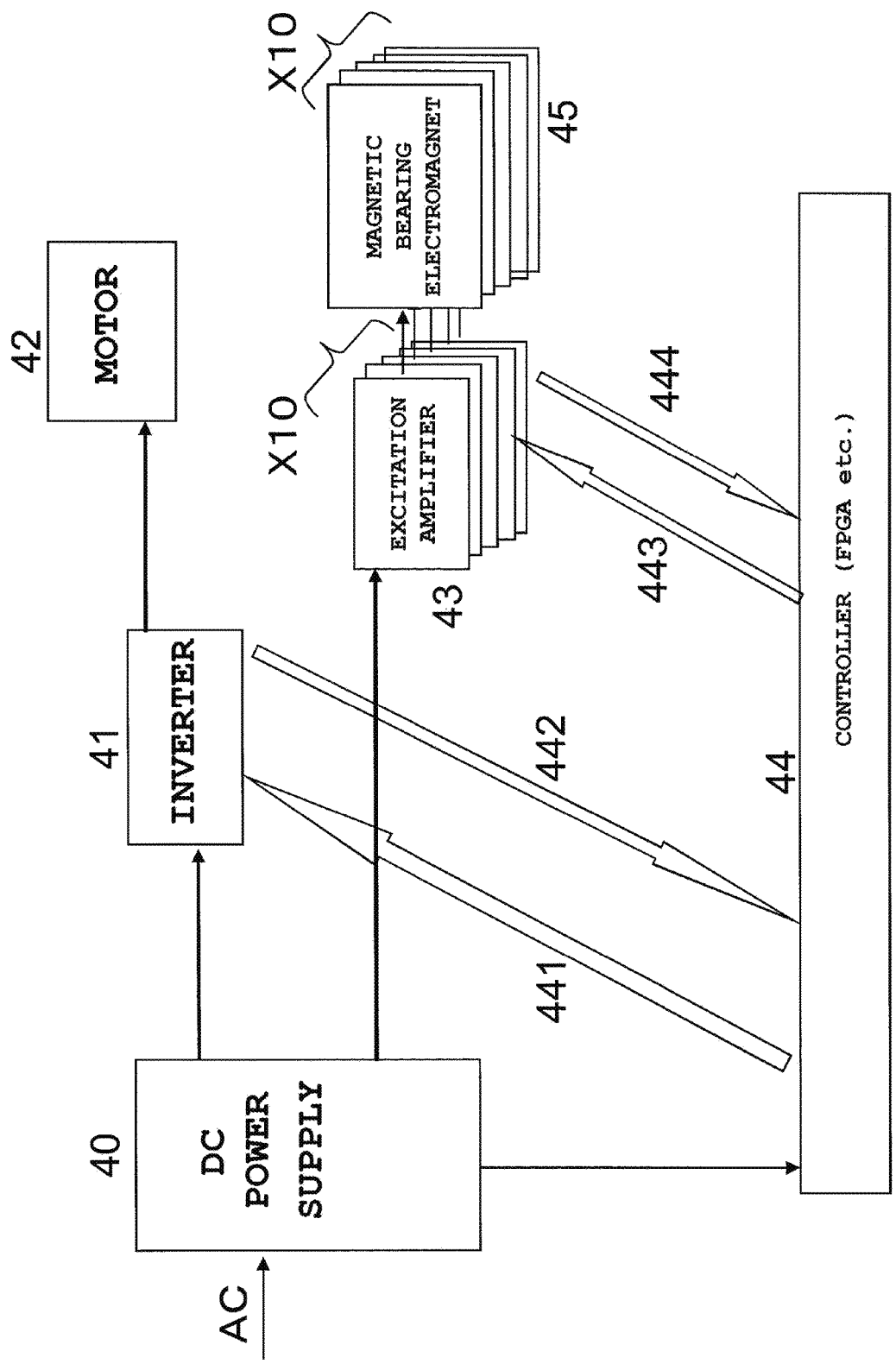
FIG. 2 is a block diagram of an outline configuration of a control unit.

FIG. 2 is a block diagram of an outline configuration of a control system (the control unit). AC input from the outside is converted from AC into DC by a DC power supply 40 provided at the control unit. The DC power supply 40 forms a power supply for an inverter 41, a power supply for each excitation amplifier 43, and a power supply for the controller 44.

The inverter 41 configured to supply current to the motor 42 includes a plurality of switching elements. The motor 42 is driven in such a manner that the controller 44 controls ON/OFF of these switching elements.

Ten magnetic bearing electromagnets 45 illustrated in FIG. 2 indicate magnetic bearing electromagnets provided for the magnetic bearings 67, 68, 69. As described above, the magnetic bearings used for the turbo-molecular pump illustrated in FIG. 1 form the five-axis control magnetic bearing. The radial magnetic bearings 67, 68 are each a biaxial magnetic bearing, and each include two pairs of magnetic bearing electromagnets 45 (four magnetic bearing electromagnets 45). Moreover, the axial magnetic bearing 69 is a uniaxial magnetic bearing, and includes a pair of magnetic bearing electromagnets 45 (two magnetic bearing electromagnets 45). The excitation amplifier 43 configured to supply current to the magnetic bearing electromagnets 45 is provided for each of ten magnetic bearing electromagnets 45.

The controller 44 configured to control driving of the motor 42 and driving of the magnetic bearings includes, for example, a digital arithmetic unit such as a field programmable gate array (FPGA), and a peripheral circuit thereof. For motor control, a PWM control signal 441 for controlling ON/OFF of the plurality of switching elements provided at the inverter 41 is input from the controller 44 to the inverter 41. Moreover, a signal 442 on the phase voltage and phase current of the motor 42 is input from the inverter 41 to the controller 44.

For magnetic bearing control, a PWM gate drive signal 443 for controlling ON/OFF of a switching element included in each excitation amplifier 43 is input from the controller 44 to each excitation amplifier 43. Moreover, a current detection signal 444 on a current value of each magnetic bearing electromagnet 45 is input from each excitation amplifier 43 to the controller 44.

Figure 3:
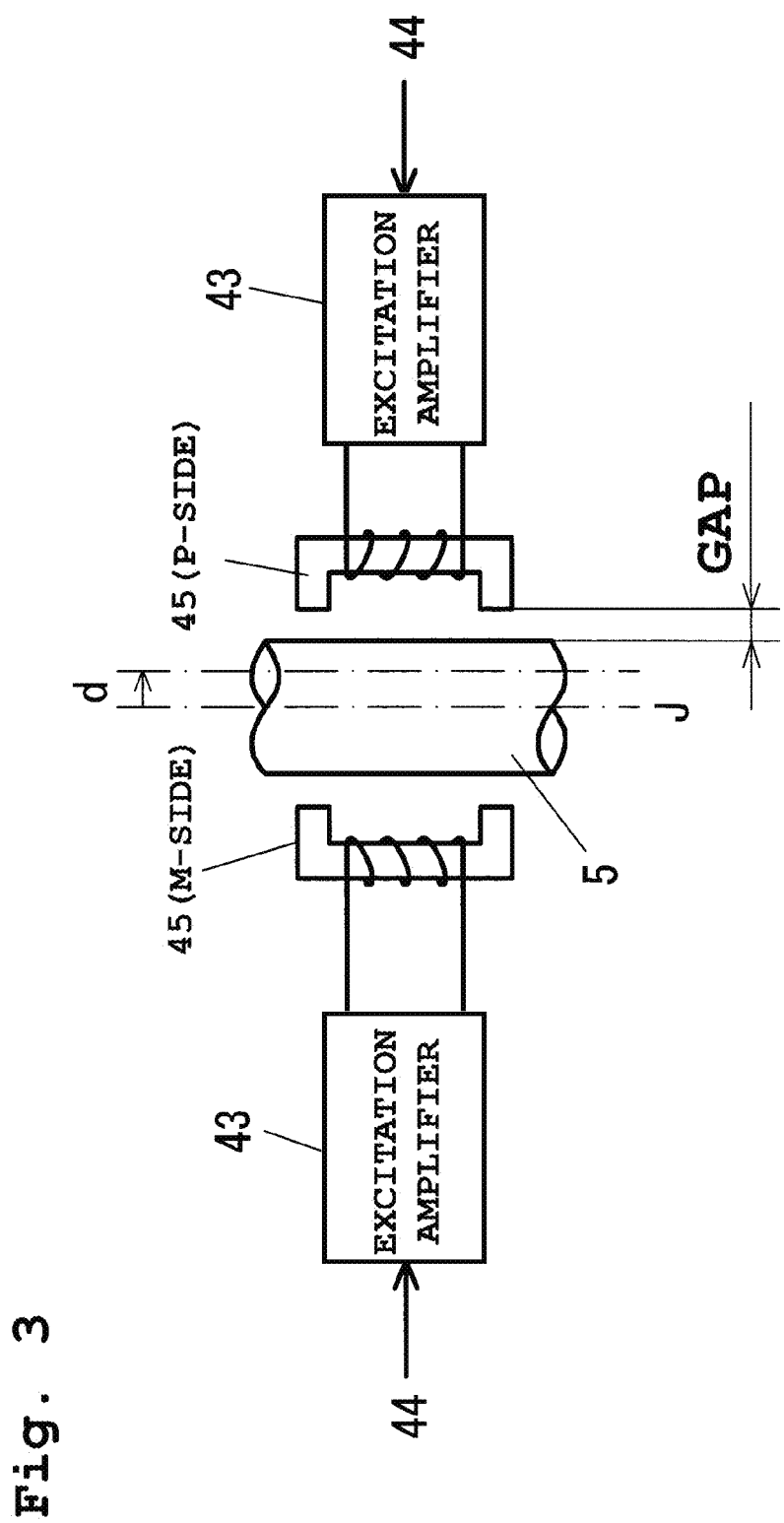
FIG. 3 is a schematic diagram of a magnetic bearing electromagnet for a single control axis.

FIG. 3 is a schematic diagram of the magnetic bearing electromagnets 45 for a single control axis as provided at the magnetic bearings 67, 68. The two magnetic bearing electromagnets 45 are arranged facing each other to sandwich a levitation center axis (a levitation target position) J. As described above, the excitation amplifier 43 is provided for each magnetic bearing electromagnet 45. In FIG. 3, a displacement d toward the P-side (the right side as viewed in the figure) magnetic bearing electromagnet 45 is a positive displacement. The magnetic bearing electromagnet 45 on a negative displacement side will be referred to as a "M-side magnetic bearing electromagnet 45."

(Description of Electromagnet Currents Ip, Im)

In the five-axis control magnetic bearing of the present embodiment, the electromagnet current of each magnetic bearing electromagnet 45 is, when categorized into components according to functions, a bias current ib, a levitation control current ic, and a current is for the sensor carrier component for position detection. When a current flowing through the P-side magnetic bearing electromagnet 45 is Ip and a current flowing through the M-side magnetic bearing electromagnet 45 is Im, Expression (1) is represented as follows. In Expression (1), "isp" represents a sensor carrier component on a P-side, and "ism" represents a sensor carrier component on an M-side. Note that isp and ism represent amplitudes with opposite signs.

$$Ip = ib + ic + isp$$

$$Im = ib - ic + ism \quad (1)$$

The bias current ib is a DC or extremely-low frequency, and is used as a bias for force for balancing with the gravity acting on the rotor unit R, linear improvement of levitation force, displacement sensing.

The levitation control current ic is a current used as control force for levitating the shaft 5 (i.e., the rotor unit R) to a predetermined position. The levitation control current ic changes according to fluctuation in the levitation position, and therefore, a frequency band thereof is from DC to about 1 kHz.

The sensor carrier component is is a current component used for detection of levitation position displacement of the shaft 5 (i.e., levitation position displacement of the rotor unit R). For suppressing levitation control force influence as much as possible, a frequency in a frequency band of several kHz to several tens of kHz (1 kHz<<fc<<100 kHz) is typically used for the sensor carrier component is.

In general, a voltage control type PWM amplifier is applied as the excitation amplifier 43 in an industrial magnetic bearing. That is, the electromagnet current is controlled in such a manner that voltage applied to an electromagnet coil of the magnetic bearing electromagnet 45 is controlled.

Of voltages Vp, Vm applied to the electromagnet coil, sensor carrier components vsp, vsm are applied with opposite phases, and therefore, Expression (2) is represented as follows. Note that ωc=2πfc is satisfied, and "fc" represents a sensor carrier frequency. Moreover, "t" represents a time, and "v" represents a constant amplitude value.

$$vsp = -v \times \sin(\omega c \times t)$$

$$vsm = v \times \sin(\omega c \times t) \quad (2)$$

A gap (see FIG. 3) between the magnetic bearing electromagnet 45 and the shaft 5 is inversely proportional to the inductance of the electromagnet coil. Thus, for the inductances Lp, Lm of the P-side electromagnet coil and the M-side electromagnet coil, Expression (3) is satisfied. Note that "D" represents a gap when the shaft 5 is on the levitation center axis (the levitation target position), and "d" represents a displacement from the levitation target position. Moreover, "A" represents a constant.

$$1/Lp = A \times (D - d)$$

$$1/Lm = A \times (D + d) \quad (3)$$

For the sensor carrier component, a relationship between the voltage applied to the electromagnet coil and a current flowing through the electromagnet coil is as in Expression (4) below.

$$vsp = Lp \times d(isp)/dt$$

$$vsm = Lm \times d(ism)/dt \quad (4)$$

From Expressions (2), (3), and (4) above, the sensor carrier components isp, ism of the current flowing through the electromagnet coil are represented as in Expression (5) below. Note that $B = v \times A/\omega c$ is satisfied. As described above, the sensor carrier components isp, ism are subjected to amplitude modulation by a time change in the displacement d. On the other hand, the bias current ib and the levitation control current is have low frequencies, and therefore, displacement fluctuation influence can be ignored.

$$\begin{aligned} isp &= -v \times \sin(\omega c \times t - \pi/2)/(\omega c \times Lp) \\ &= -B(D-d) \times \sin(\omega c \times t - \pi/2) \\ ism &= v \times \sin(\omega c \times t - \pi/2)/(\omega c \times Lm) \\ &= B(D+d) \times \sin(\omega c \times t - \pi/2) \end{aligned} \quad (5)$$

As a result of above, information on the displacement d is obtained by detection of the sensor carrier components isp, ism. Total currents Ip, Im flowing through the P-side and M-side magnetic bearing electromagnets 45 are represented by Expression (6) as follows.

$$Ip = ib + ic - B(D-d) \times \sin(\omega cx t - \pi/2)$$

$$Im = ib - ic + B(D+d) \times \sin(\omega cx t - \pi/2) \quad (6)$$

A sum signal (Ip+Im) of the currents Ip, Im as in Expression (7) below is considered herein. When such a sum signal (Ip+Im) passes through a high-pass filter, a bias component (2×ib) contained in the sum signal (Ip+Im) is removed. As a result, the second term on the right side in Expression (7) remains, and the sum signal (Ip+Im) can be used as a displacement signal.

$$Ip + Im = 2 \times ib + 2 \times B \times d \times \sin(\omega cx t - \pi/2) \quad (7)$$

(Excitation Amplifier 43)

Figure 4:
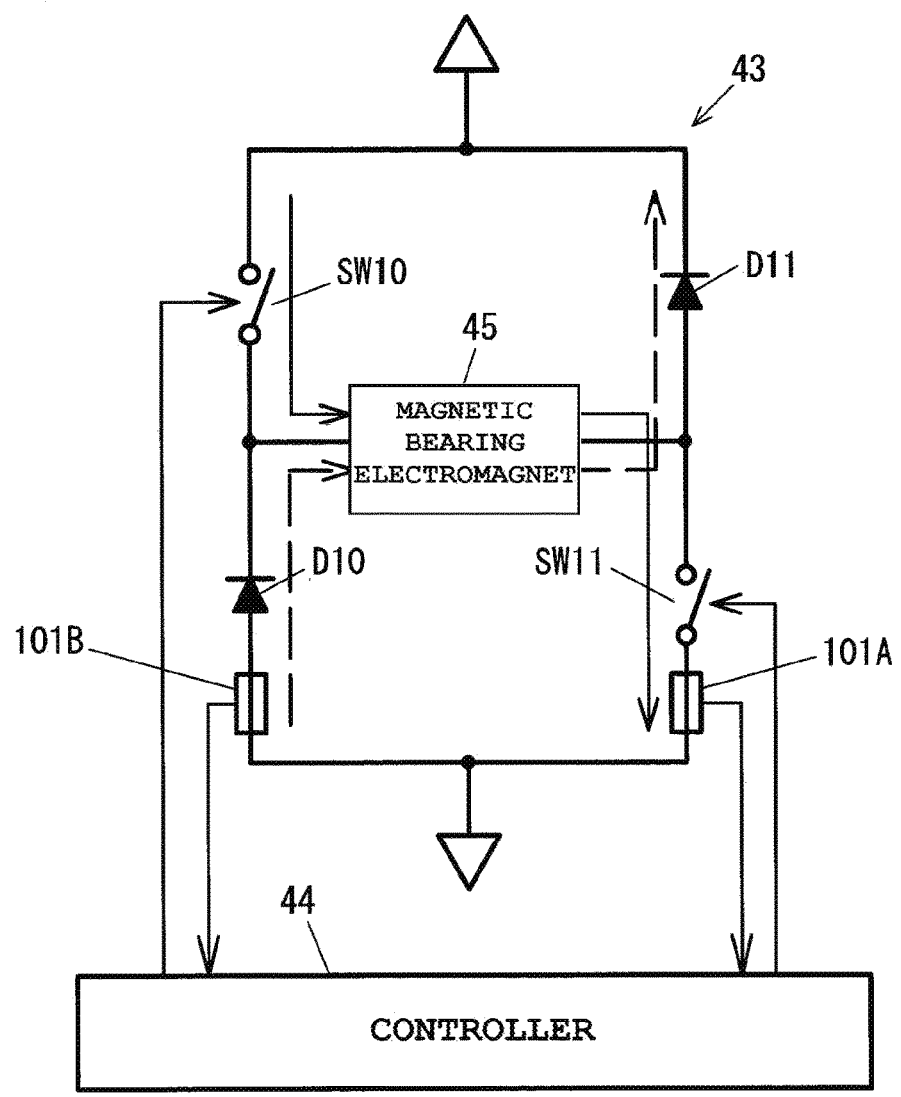
FIG. 4 is a diagram of an excitation amplifier configuration.

FIG. 4 is a diagram of the configuration of the excitation amplifier 43 provided for a corresponding magnetic bearing electromagnet 45. The excitation amplifier 43 is configured such that two pairs of the switching element and a diode connected in series are further connected in parallel. The magnetic bearing electromagnet 45 is connected in between the switching element SW10 and the diode D10 and between the switching element SW11 and the diode D11.

The PWM control signal (the PWM gate drive signal 443 of FIG. 2) for controlling the bias current ib, the levitation control current ic, and the sensor carrier component is is, as a gate signal (a gate drive voltage) from the controller 44, input to the switching elements SW10, SW11.

The switching elements SW10, SW11 are simultaneously turned on/off. In a case where both elements are ON, current (the above-described currents Ip, Im) flows as indicated by solid arrows. In a case where both elements are OFF, current (the above-described currents Ip, Im) flows as indicated by dashed arrows. A current value in an ON state is measured by a current sensor 101A, and a current value in an OFF state is measured by a current sensor 101B. For example, shunt resistors are used as the current sensors 101A, 101B, and the voltage of the shunt resistor is used as the current detection signal. The current detection signal is input to the controller 44.

Figure 5:
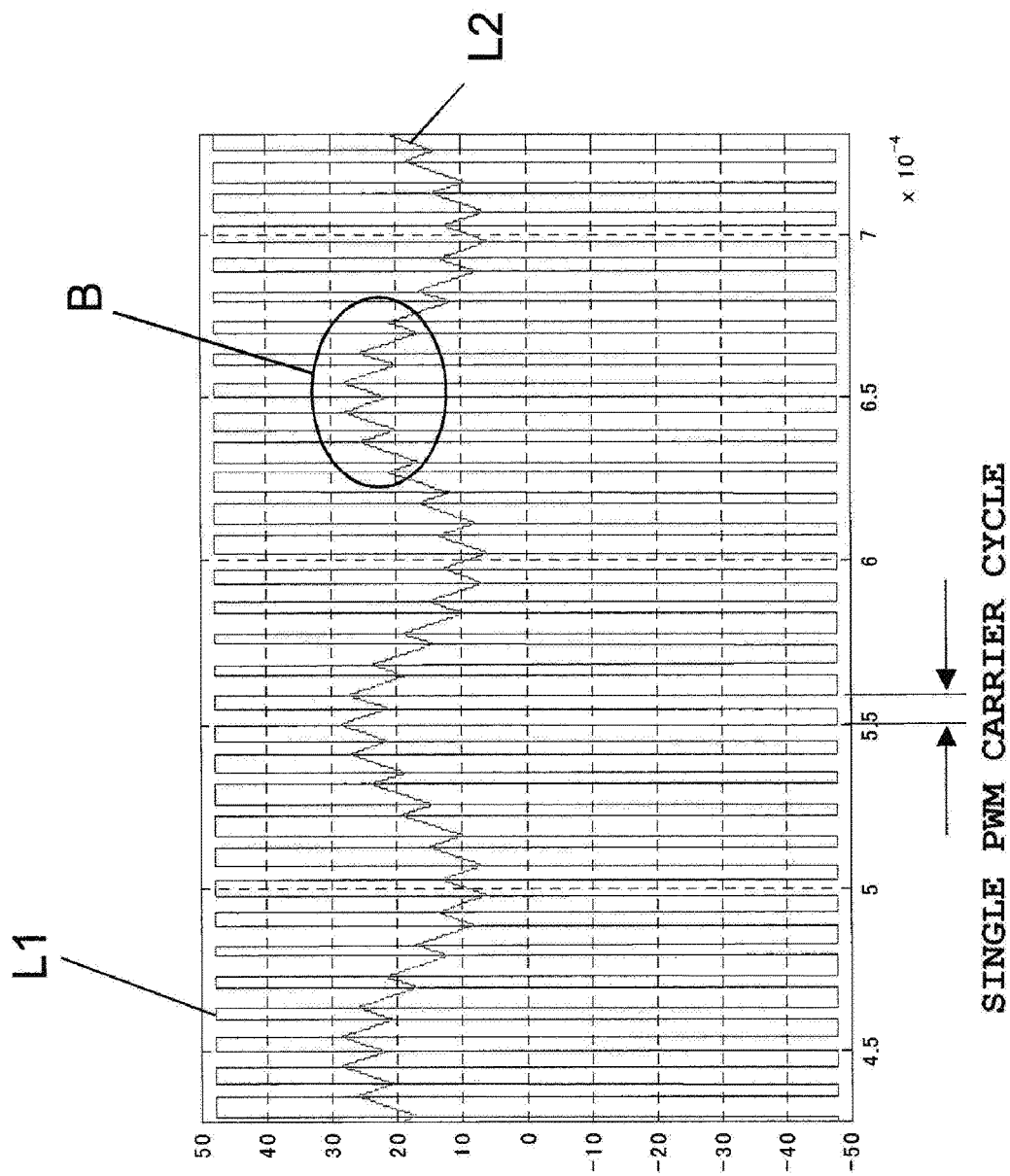
FIG. 5 is a graph of an example of voltage applied to an electromagnet coil and current flowing through the electromagnet coil.

FIG. 5 is a graph of an example of the voltage (a line L1) applied to the electromagnet coil by the excitation amplifier 43 and the current (a line L2) flowing through the electromagnet coil. When the two switching elements SW10, SW11 are turned on, voltage is applied to the electromagnet coil, and accordingly, current increases. Moreover, when the switching elements SW10, SW11 are turned off, reverse voltage is applied to the electromagnet coil due to conduction of the diodes D10, D11, and accordingly, current decreases. Thus, the current line L2 shows both of current increase and decrease in a single PWM carrier cycle and a sinusoidal change with a longer cycle. Such a sinusoidal change corresponds to a sensor carrier component change.

Figure 6:
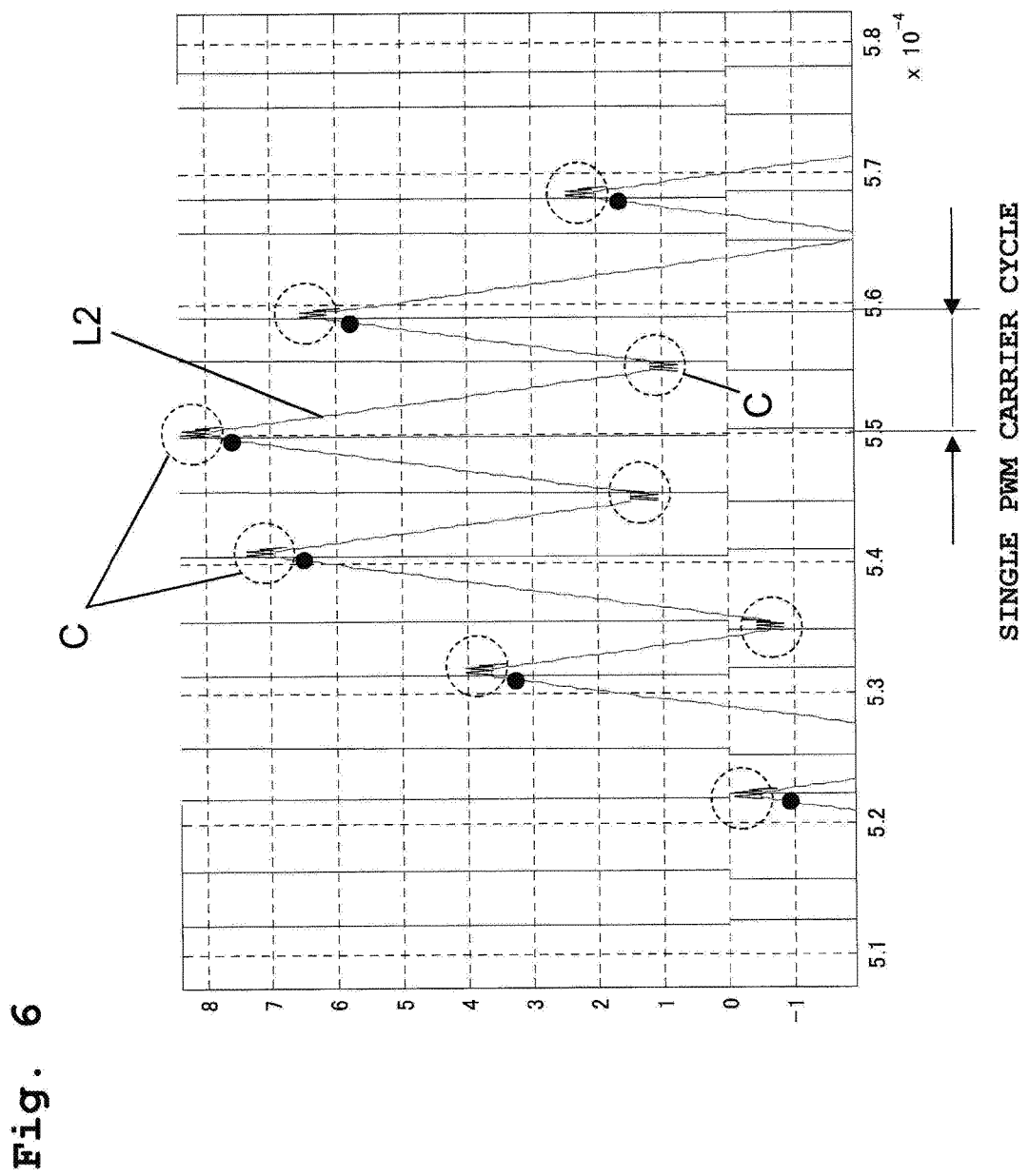
FIG. 6 is a graph of an enlarged portion indicated by a reference character "B" of FIG. 5.

FIG. 6 is a graph of an enlarged portion indicated by a reference character "B" of FIG. 5. It can be seen that when the switching elements SW10, SW11 are switched from the ON state (an upward line) to the OFF state (a downward line) and when the switching elements SW10, SW11 are switched from the OFF state (the downward line) to the ON state (the upward line), spike-shaped noise C due to, e.g., surge voltage is caused. In a typical magnetic bearing device, such noise component influence results in a lower S/N ratio in displacement detection. For this reason, in the present embodiment, control as described below is performed for suppressing the noise component influence in magnetic bearing control.

Figure 7A:
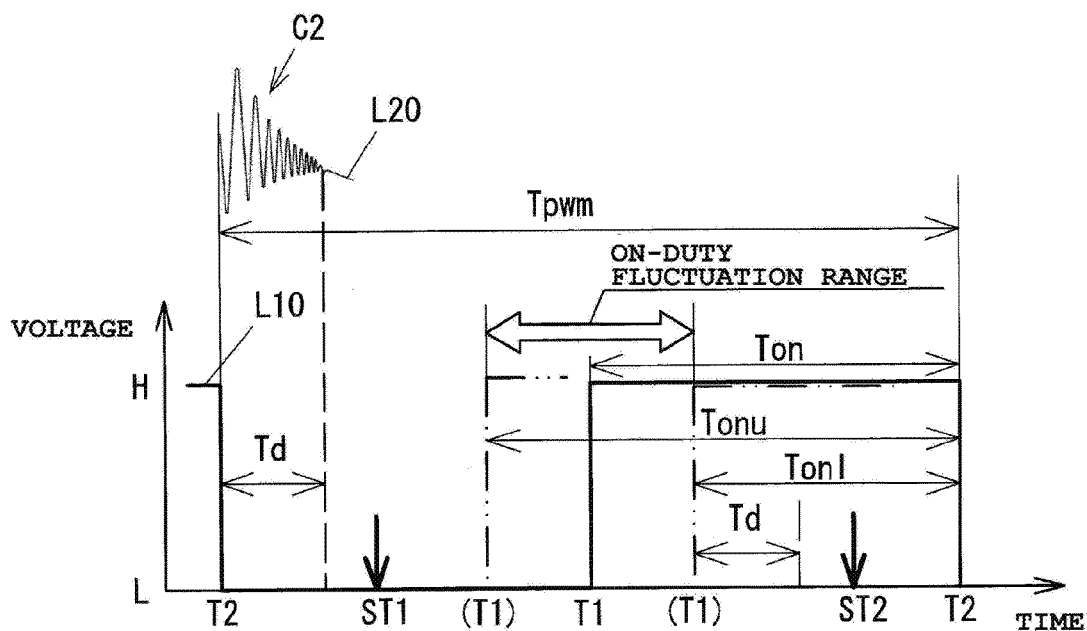
FIGS. 7A and 7B are graphs for describing a relationship between PWM-modulated electromagnet current (a line L10) and spike noise C.
Figure 7B:
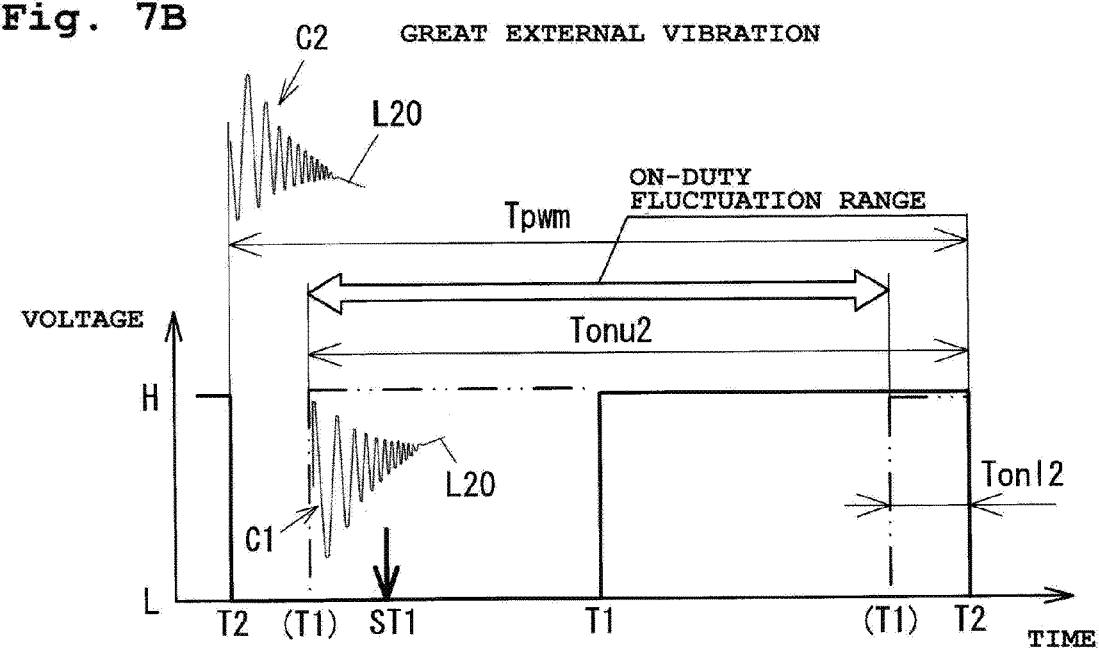

FIGS. 7A and 7B are graphs for describing a relationship between a PWM-modulated electromagnet voltage (a line L10) and the spike noise C. The PWM-modulated electromagnet voltage is a rectangular voltage changing between a voltage H and a voltage L according to ON/OFF of the PWM control signal. In FIGS. 7A and 7B, "Tpwm" represents a PWM modulation cycle (a PWM cycle). FIGS. 7A and 7B show a voltage change in a single PWM cycle Tpwm. A line L20 shows the current detection signal, and portions indicated by reference numerals C1, C2 are spike noise. The spike noise C1, C2 is caused at rising timing T1 (L to H) and trailing timing T2 (H to L) of the rectangular voltage.

Moreover, "Ton" represents a duration of an on-duty zone of the rectangular voltage. In PWM control of the electromagnet current, the duration Ton of the on-duty zone is controlled so that the shaft 5 can be held at a desired levitation position. FIG. 7A shows the fluctuation range of the on-duty zone Ton under quiet environment where external vibration received by the turbo-molecular pump (i.e., the magnetic bearing device) is small. On the other hand, FIG. 7B shows the fluctuation range of the on-duty zone Ton in the case of great external vibration (non-quiet environment).

When vibration is applied to the turbo-molecular pump from the outside, the levitation position of the rotor unit R in the pump changes, leading to great amplitude fluctuation of the control current. Thus, as shown in FIG. 7B, the on-duty fluctuation range also becomes greater. In FIGS. 7A and 7B, a chain double-dashed line indicates the upper limit (indicated by "Tonu") and the lower limit (indicated by "Tonl") of the changeable on-duty zone. Under the quiet environment, the on-duty zone changes with a slight duty ratio (=Ton/Tpwm) range of around 50%. On the other hand, in the case of great external vibration, the on-duty fluctuation range is greater as shown in FIG. 7B, and the rising timing T1 from OFF (L) to ON (H) greatly shifts right to left.

Reference numerals ST1, ST2 each indicate the sampling timing of the current detection signal. Under the quiet environment shown in FIG. 7A, when the current detection signal is AD-sampled at the sampling timing ST1, the current detection signal with less influence of the spike noise C2 can be obtained. That is, the spike noise C2 caused at the trailing timing T2 before the sampling timing ST1 is sufficiently attenuated before the sampling timing ST1. Moreover, even in the case of the on-duty upper limit Tonu with the longest on-duty duration, the sampling timing ST1 does not come after the rising timing T1 in terms of time. Thus, the spike noise at the rising timing T1 provides no influence on the current detection signal AD-sampled at the sampling timing ST1.

On the other hand, in the case of a great on-duty fluctuation range due to great external vibration, the sampling timing ST1 might come, in terms of time, after the rising timing T1 at the on-duty upper limit Tonu2, as shown in FIG. 7B. In an example shown in FIG. 7B, the spike noise C1 caused at the rising timing T1 is not sufficiently attenuated even at the sampling timing ST1. For this reason, the spike noise C1 provides influence on the current detection signal to be AD-sampled. Note that the on-duty upper limit Tonu2 and lower limit Tonl2 as shown in FIG. 7B satisfy, in relation to Tonu and Tonl of FIG. 7A, Tonu2>Tonu and Tonl2<Tonl.

A situation as in FIG. 7B is caused due to action of disturbance such as earthquake, for example. When the influence of the spike noise superimposed on the electromagnet current is fed back via the current detection signal, such influence is converted into vibration force at the electromagnet, leading to pump vibration.

In the course of the control of returning the rotor unit R to a predetermined levitation position when the rotor unit R greatly displaces due to temporal action of external vibration such as earthquake, even when pump vibration due to the influence of the spike noise temporarily increases, such pump vibration might not be a problem in practical use. For example, in analysis measurement equipment such as an electronic microscope equipped with a turbo-molecular pump, a strict low-vibration state is required at the timing of observing a sample. For this reason, such observation is made in a quiet state without disturbance, and no observation is made in a case where disturbance is present.

That is, upon observation, the excitation current of the magnetic bearing of the turbo-molecular pump is in a small on-duty fluctuation state as shown in FIG. 7A. Thus, it is not necessary that a duty variable range in PWM control is limited to constantly suppress switching noise influence as in JP-A-2014-137116 described above.

For this reason, in the present embodiment, the sampling timing ST1 is set such that AD sampling is performed within a zone satisfying Expression (A) below. With this configuration, at least under the quiet environment, the influence of the spike noise on the AD-sampled current detection signal can be prevented. Note that "Td" in Expression (A) represents a time (an attenuation time) after occurrence of the spike noise until the noise component influence no longer becomes a problem by attenuation thereof.

$$Td < ST1 < Tpwm - Tonu \quad (A)$$

Note that Expression (A) represents a condition for the sampling timing ST1 in the case of performing AD sampling in an off-duty zone. In the case of performing AD sampling in the on-duty zone, AD sampling may be performed at the sampling timing ST2 within a zone satisfying Expression (B) below.

$$Tpwm - Tonl + Td < ST2 < Tpwm \quad (B)$$

More preferably, the sampling timing may be set as in Expressions (C) and (D) below instead of Expressions (A) and (B). Note that "Tmin" represents the minimum intake zone for taking a signal into an AD converter upon AD sampling. When the signal is taken within the minimum intake zone Tmin after a lapse of the attenuation time Td, the signal with almost no spike noise influence can be taken.

$$Td < ST1 < Td + Tmin \quad (C)$$

$$Tpwm - Tmin < ST2 < Tpwm \quad (D)$$

Figure 8:
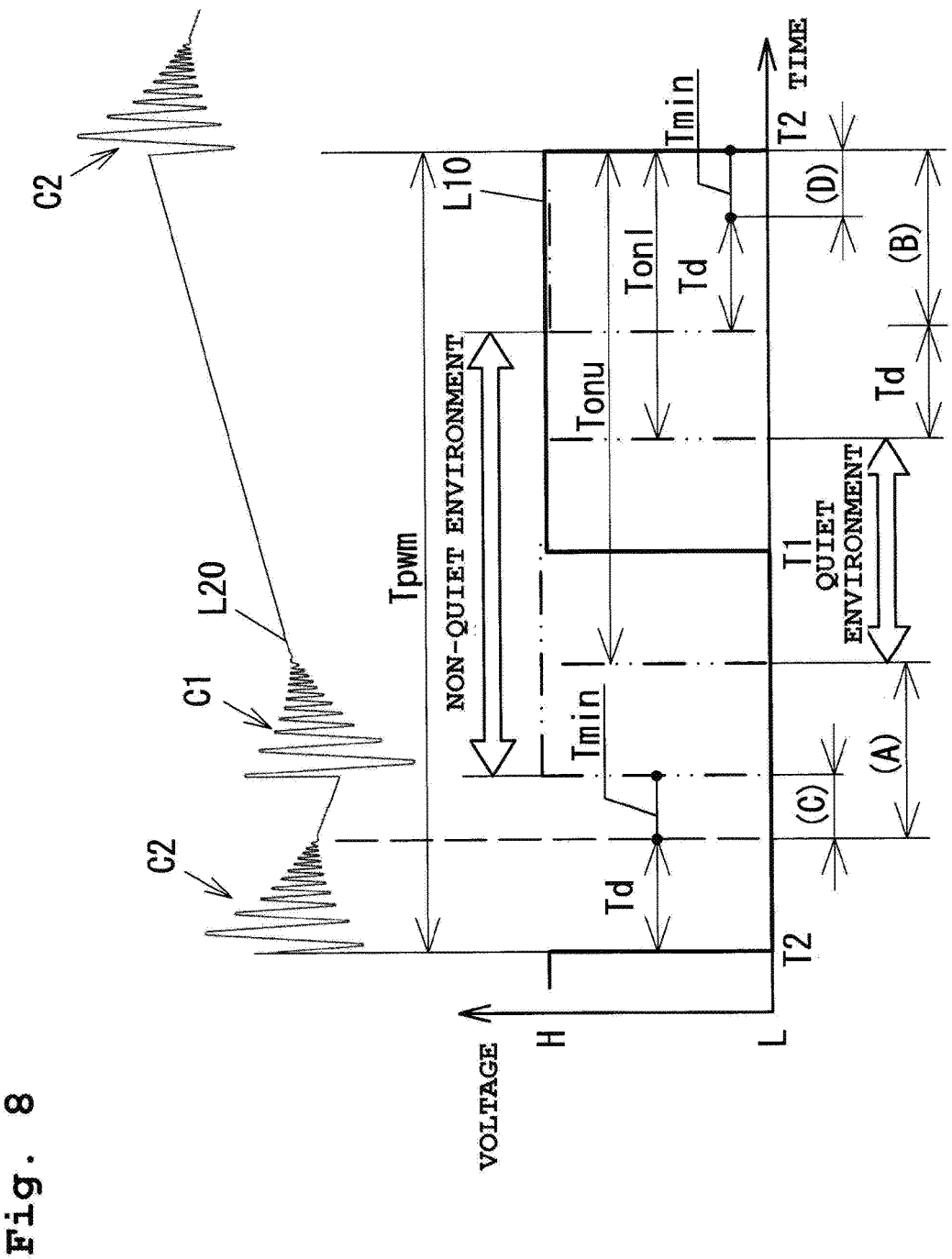
FIG. 8 is a graph for describing the ranges of Expressions (A) to (D)

FIG. 8 is a graph for describing the ranges of Expressions (A) to (D). Suppose that the sampling timing ST1 in the off-duty zone is set to the vicinity of a time of Tpwm−Tonu within the range of Expression (A). When an actual on-duty fluctuation range is greater than that under the quiet environment, the AD-sampled current detection signal shows the spike noise influence. On the other hand, in the case of setting within the range of Expression (C), no spike noise influence is shown even when the on-duty zone changes to the on-duty fluctuation range shown as the non-quiet environment.

Moreover, in a case where the sampling timing ST2 in the on-duty zone is set to the vicinity of a time of Tpwm−Tonl+ Td within the range of Expression (B), when the actual on-duty fluctuation range is greater than that under the quiet environment, the AD-sampled current detection signal shows the spike noise influence. On the other hand, in the case of setting within the range of Expression (D), no spike noise influence is shown even when the on-duty zone changes to the on-duty fluctuation range shown as the non-quiet environment.

As described above, in the case of setting the sampling timing ST1, ST2 within the ranges of Expressions (A) and (B), no spike noise influence is caused under the quiet environment, but the spike noise influence is easily caused in the case of not being under the quiet environment. On the other hand, in the case of setting within the ranges of Expressions (C) and (D), an allowable external vibration range is expanded. As a result, even when the on-duty zone changes, due to external vibration, to the on-duty fluctuation range under the non-quiet environment of FIG. 8, no spike noise influence is caused.

Figure 9:
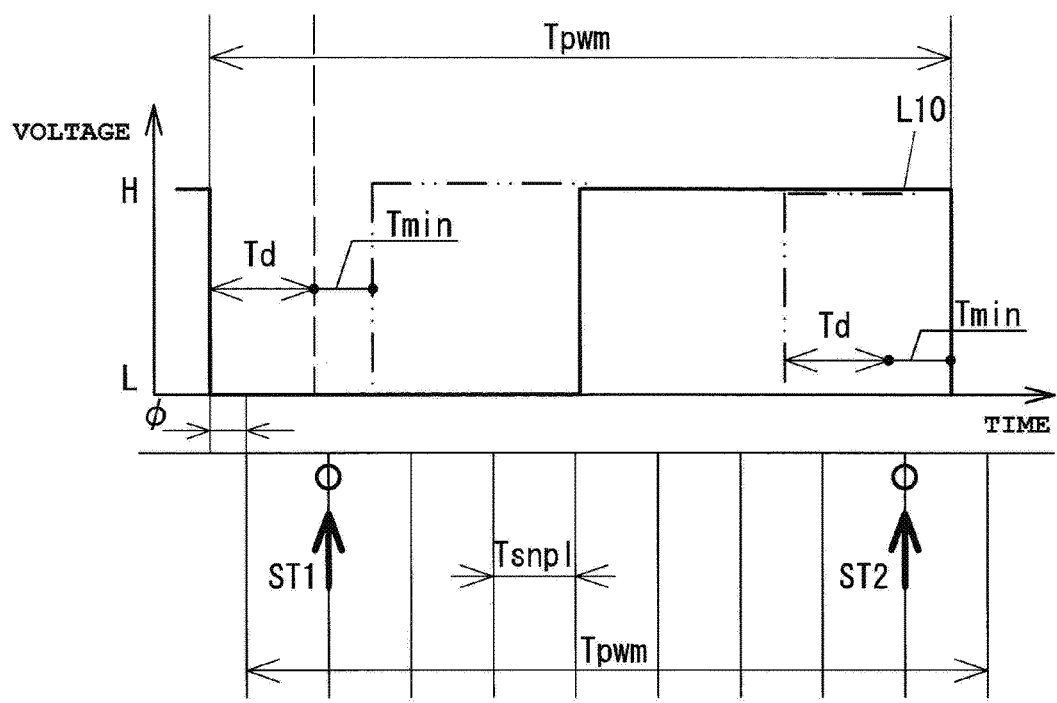
FIG. 9 is a graph of an example of sampling timing in the case of setting the ranges as in Expressions (C) and (D)

FIG. 9 is a graph of an example of the sampling timing ST1, ST2 in the case of setting the ranges as in Expressions (C) and (D). In this example, a cycle Tsnpl satisfying Tpwm=n×Tsnpl (note that "n" is a positive integer) is considered in relation to the PWM cycle Tpwm (a PWM frequency of fpwm=1/Tpwm). As shown in FIG. 9, the sampling timing ST1, ST2 is set in the cycle Tsnpl obtained by division of the PWM cycle Tpwm by n.

Tsnpl is set to about a time cycle (Td+Tmin) or shorter. For example, when Td is about 1 μs and Tmin is about 0.5 μs, Td+Tmin=1.5 μs is satisfied. When the PWM frequency satisfies fpwm=80 kHz, if fsnpl=8·fpwm (i.e., Tpwm=8·Tsnpl) is set, fsnpl=640 kHz is satisfied. In this state, Tnspl 1.56 μs is satisfied, and Tnspl is about equal to Td+Tmin=1.5 μs. Note that in FIG. 9, "φ" represents a phase adjustment amount for setting the sampling timing ST1, ST2 within the zone Tmin, and is an amount corresponding to about Tmin.

The PWM frequency fpwm, the sensor carrier frequency fc, and the sampling frequency fs are preferably set as in fpwm=M·fs=N·fc in relation to integers M, N satisfying N≥M>1. In addition, the sampling timing is preferably set for performing AD sampling at every time interval Tsnpl being equal to or shorter than the time (Td+Tmin) and satisfying Tpwm=L·Tsnpl in relation to the integer L (>1). With this setting, AD sampling points can be dispersedly arranged at such sampling timing that no spike noise influence is caused on the signals (the current detection signals and the sum signals) for all axes. Moreover, all axes are in synchronization with each other in PWM control, and therefore for all axes, the zones without the noise influence are coincident with each other in the cycle Tpwm. Thus, AD sampling without the noise influence can be performed for all axes.

Since the time interval is equal to or shorter than the time (Td+Tmin), AD sampling can be performed without the spike noise influence even in the case of setting as in the zones (C) and (D) of FIG. 8. Further, the AD sampling timing can be entirely adjusted by Φ (corresponding to about Tmin), and therefore, the sampling timing ST1, ST2 can be easily set within the zone Tmin.

In the present embodiment, after the PWM cycle has been synchronized among the excitation amplifiers 43 for all axes, AD sampling is performed at the same timing as the zone (A) or (C) as the off-duty zone and the same timing as the zone (B) or (D) as the on-duty zone, as shown in FIG. 9.

Figure 10:
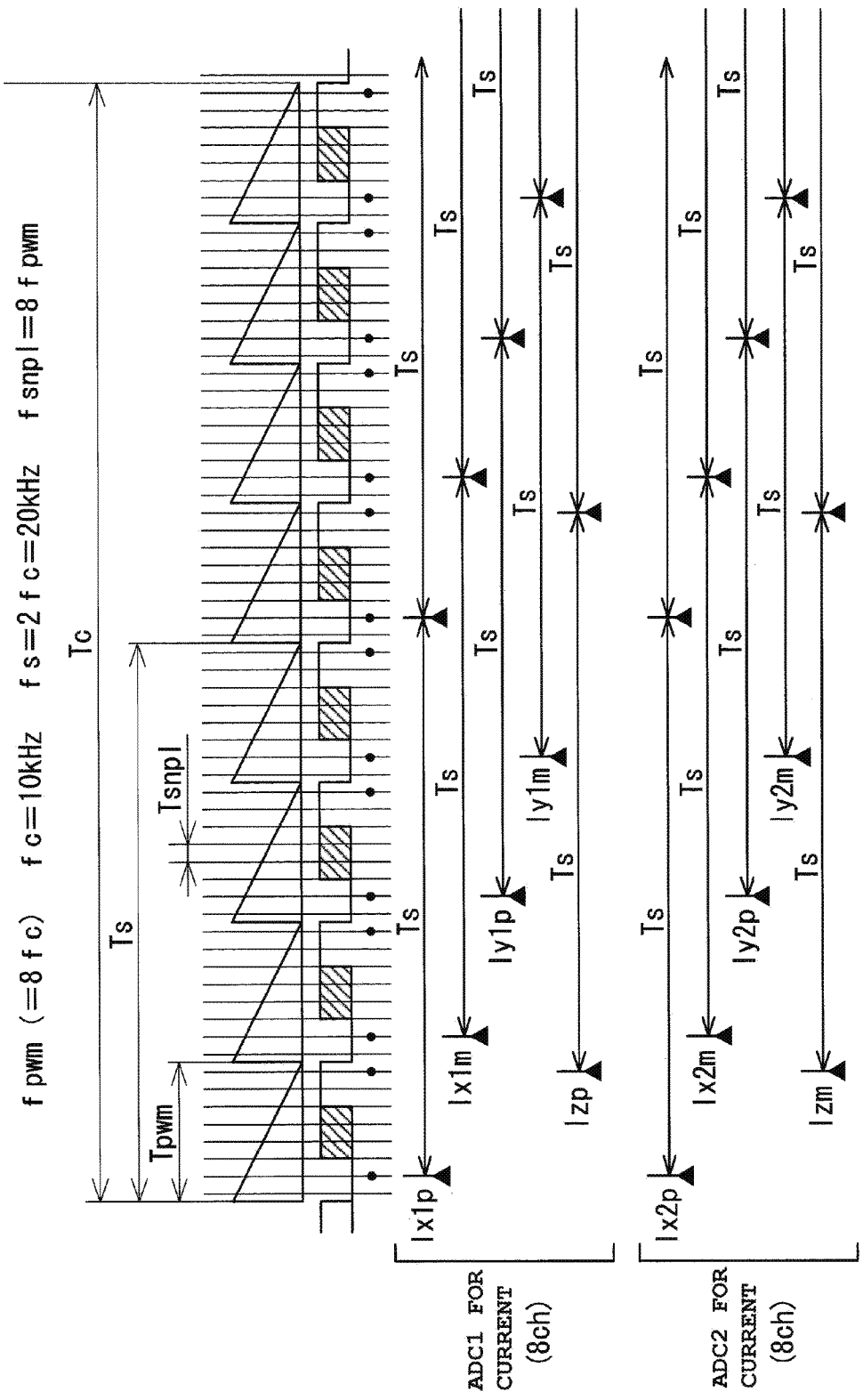
FIG. 10 is a chart of sampling timing of each current detection signal.
Figure 11:
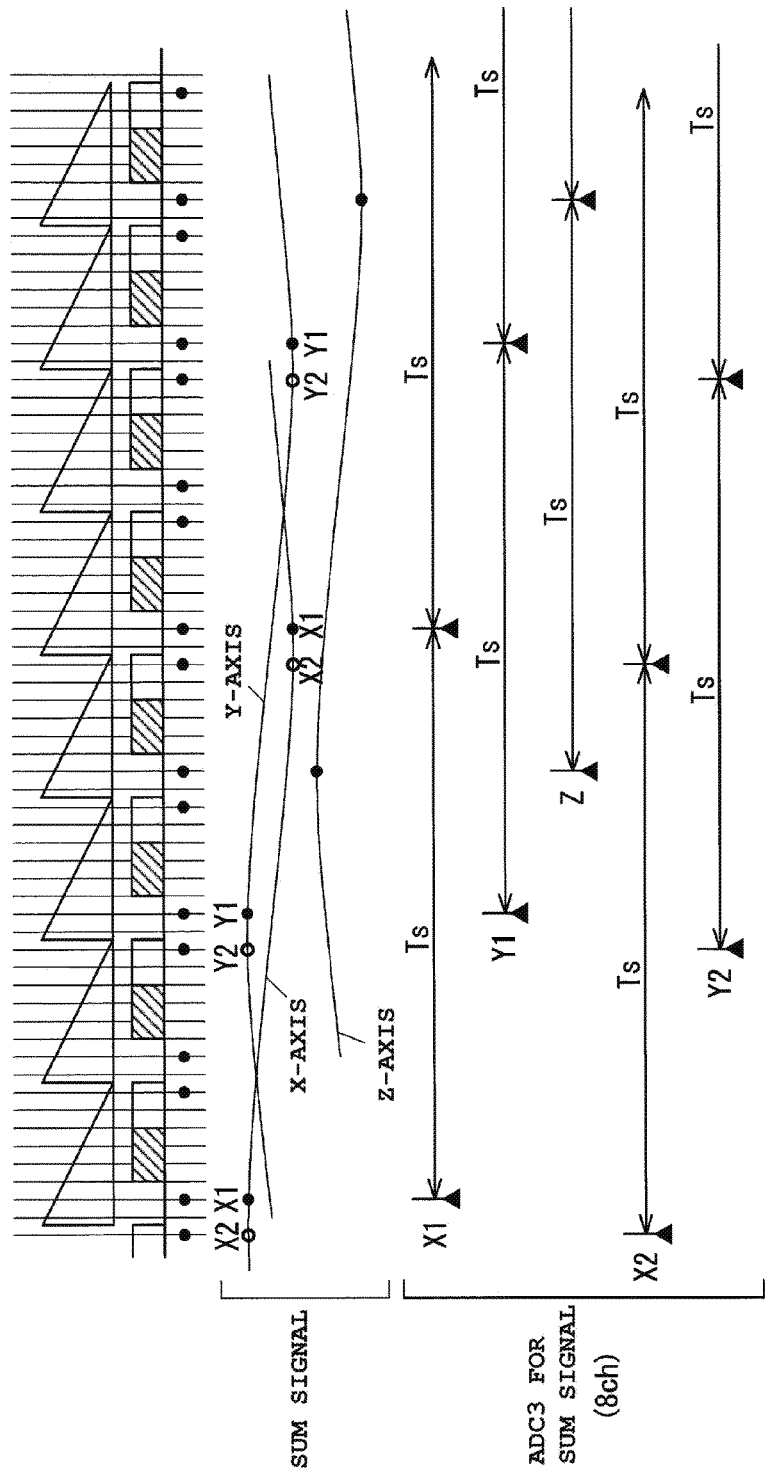
FIG. 11 is a chart of an example of sampling timing of each sum signal.

FIGS. 10 and 11 are charts of an example of the sampling timing of each of the current detection signals and the sum signals as the displacement signals. FIG. 10 is the chart of the sampling timing of the current detection signals, and shows ten signals (lx1p, lx1m, ly1p, ly1m, lx2p, lx2m, ly2p, ly2m, lzp, lzm) for five axes (lx1, ly1, lx2, ly2, lz). FIG. 11 is the chart of the sampling timing of each sum signal (five signals) as the displacement signal. In FIG. 11, X1 is lx1p+lx1m, Y1 is ly1p+ly1m, X2 is lx2p+lx2m, Y2 is ly2p+ly2m, and Z is lzp+lzm. In this example, three AD converters (eight channels) for analog-to-digital conversion are used for 15 signals. Of these three AD converters, two AD converters (ADC1, ADC2) are used for the current detection signals, and the single AD converter (ADC3) is used for the sum signals.

Note that the sensor carrier frequency fc is 10 kHz, and the PWM frequency fpwm and the sampling frequency fs are set to an integral multiple relationship such as fpwm=8fc and fs=2fc. Moreover, the above-described cycle Tsnpl is set to a cycle obtained by division of the PWM cycle Tpwm by eight.

FIG. 10 shows, on an upper side thereof, a sawtooth wave of the cycle Tpwm and a rectangular wave showing the on/off-duty zone. Each hatched region of the rectangular wave shows the on-duty fluctuation range. The sampling timing indicated by a black circle is set to avoid the hatched regions. The frequencies fpwm, fc, fs, fsnpl are synchronized with each other for all axes. Thus, FIG. 10 shows only a pair of the sawtooth wave and the rectangular wave for 10 signals.

The sampling timing which can be used as the sampling timing ST1, ST2 of performing AD sampling is at 16 points (indicated by black circles) during a cycle Tc. The sampling timing of AD sampling of five signals (lx1p, lx1m, ly1p, ly1m, lzp) in ADC1 is dispersedly disposed at any of these 16 points.

In an example shown in FIG. 10, AD sampling is, for the current detection signal lx1p, performed at the first sampling timing from the left and the sampling timing apart from the first sampling timing by Ts, 2 Ts, . . . . Moreover, AD sampling is, for the current detection signal lx1m, performed at the third sampling timing from the left and the sampling timing apart from the third sampling timing by Ts, 2 Ts, . . . . The cycle Tsnpl is obtained by division of the PWM cycle Tpwm by n, and therefore, the sampling points at Ts, 2 Ts, . . . after a certain sampling point are surely present. AD sampling of five signals (lx2p, lx2m, ly2p, ly2m, lzm) in ADC2 is also performed as in the case of ADC1.

FIG. 11 is a chart for describing AD sampling of the sum signals (X1, Y1, X2, Y2, Z). In a sum signal section, the waveforms of the X-axis sum signal, the Y-axis sum signal, and the Z-axis sum signal are shown. As seen from Expression (7), the frequency of the sum signal is the same as the frequency fc of the sensor carrier component. The phase of the Y-axis sum signal shifts 90 degrees from that of the X-axis sum signal. As in the case of FIG. 10, the five sum signals are dispersedly arranged at any of 16 points of the sampling timing in the sensor carrier cycle Tc, and are AD-sampled by the single AD converter (ADC3).

For example, in the case of the sum signal X1, data at a point shifted from a waveform peak to the right by the cycle Tsnpl as viewed in the figure is AD-sampled as indicated by a black circle on the X-axis sum signal waveform. On the other hand, in the case of the sum signal X2, data at a point shifted from the waveform peak to the left by the cycle Tsnpl as viewed in the figure is AD-sampled as indicated by a white circle. The same applies to the sum signals Y1, Y2. In the case of the sum signal Z, data at a point of a waveform peak is AD-sampled.

Figure 12:
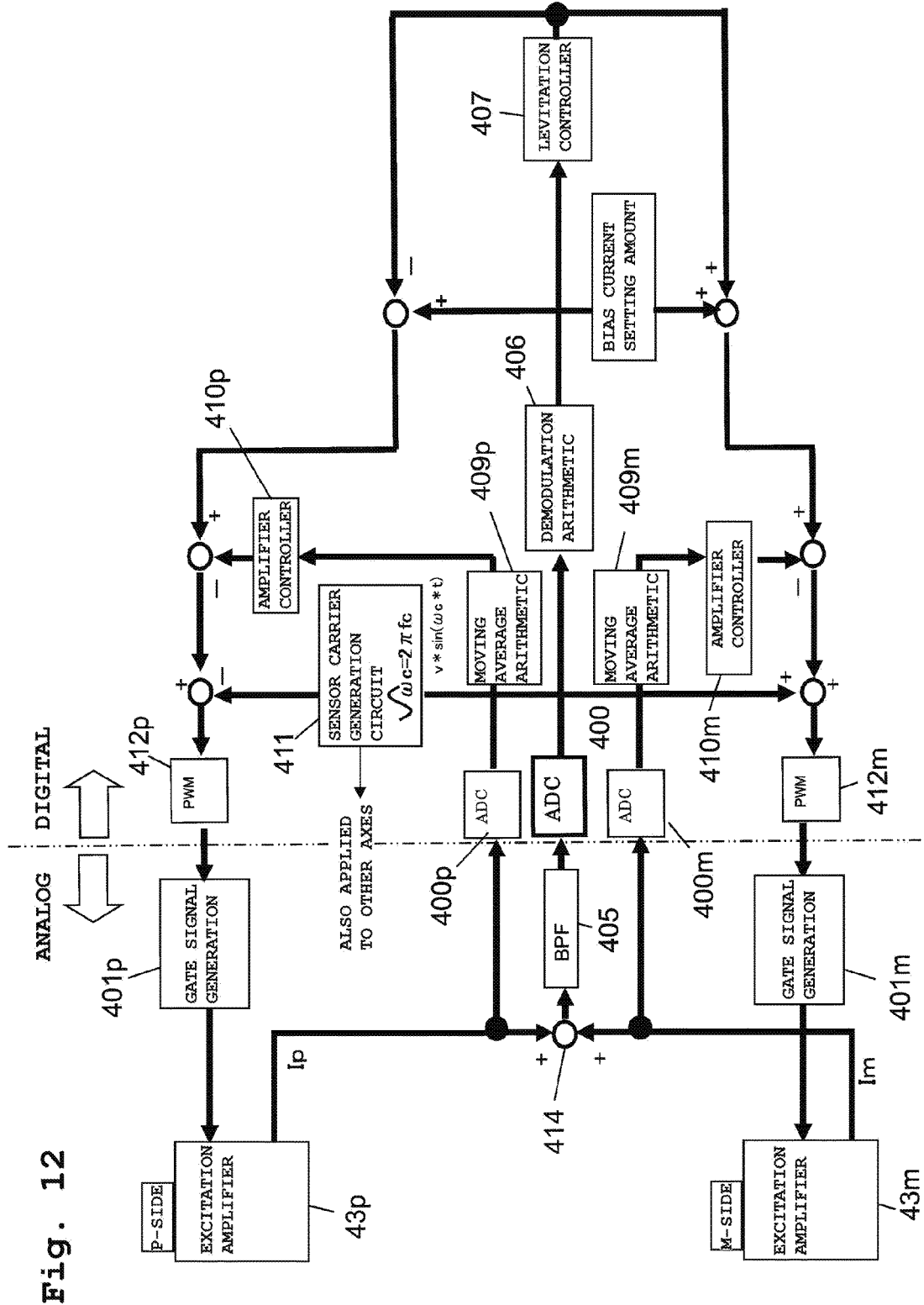
FIG. 12 is a functional block diagram in magnetic bearing control in a controller.

FIG. 12 is a functional block diagram in magnetic bearing control in the controller 44, and shows one of the five control axes. As illustrated in FIG. 3, a pair (the P-side and the M-side) of magnetic bearing electromagnets 45 is provided for a single control axis, and the excitation amplifier 43 (43p, 43m) is provided for each magnetic bearing electromagnet 45. As illustrated in FIG. 4, the excitation amplifier 43 is provided with the current sensors 101A, 101B configured to detect the electromagnet current, and the current detection signal is output from each of the ten excitation amplifiers 43.

A gate signal generation unit 401p is configured to generate, based on a PWM control signal generated by a PWM arithmetic unit 412p, a gate drive voltage (a gate signal) for driving the switching element of the P-side excitation amplifier 43p. Similarly, a gate signal generation unit 401m is configured to generate, based on a PWM control signal generated by a PWM arithmetic unit 412m, a gate signal for driving the switching element of the M-side excitation amplifier 43m.

When ON/OFF of the switching element of each excitation amplifier 43 (43p, 43m) is controlled based on the gate signal, voltage is applied to the electromagnet coil of the magnetic bearing electromagnet, and therefore, the currents Ip, Im flow. The current value of the current Ip flowing through the P-side magnetic bearing electromagnet is detected from the current sensors 101A, 101B of the P-side excitation amplifier 43p, and the current detection signal (indicated by the same reference characters "Ip" as those of the current) is output as a detection result. On the other hand, the current detection signal (indicated by the same reference characters "Im" as those of the current) of the current Im flowing through the M-side magnetic bearing electromagnet is output from the current sensors 101A, 101B of the M-side excitation amplifier 43m.

The current detection signals Ip, Im output from the excitation amplifiers 43p, 43m are taken by the corresponding AD converters 400p, 400m. Moreover, the current detection signals Ip, Im are added together by an addition unit 414, and the sum signal (Ip+Im) is output from the addition unit 414. Subsequently, the sum signal (Ip+Im) is input to an AD converter 400 via a bandpass filter 405 using the sensor carrier frequency fc as a center frequency, and is taken by the AD converter 400.

The AD converter 400 takes data by synchronous sampling based on a sensor carrier signal (a sensor carrier component) generated by a sensor carrier generation circuit 411. The sum signal (Ip+Im) taken by the AD converter 400 is input to a demodulation arithmetic unit 406. In the demodulation arithmetic unit 406, demodulation arithmetic processing is performed based on the data taken by sampling, and therefore, displacement information is obtained. In a magnetic levitation controller 407, a levitation control current setting is, based on the displacement information from the demodulation arithmetic unit 406, generated by proportional control, integral control, derivative control, phase correction, etc. A result obtained by subtraction of the levitation control current setting from a bias current setting amount is used for P-side control, and a result obtained by addition of the levitation control current setting to the bias current setting amount is used for M-side control.

Meanwhile, the current detection signals Ip, Im taken by the AD converters 400p, 400m are input respectively to corresponding moving average arithmetic units 409p, 409m. The moving average arithmetic units 409p, 409m are configured to perform moving average processing for the sampling data (lx1p, lx1m, ly1p, ly1m, lx2p, lx2m, ly2p, ly2m, lzp, lzm) taken by the converters 400p, 400m. Thus, information on current components (the bias current ib, the levitation control current ic) contributing to levitation control force is obtained.

An arithmetic result of the moving average arithmetic unit 409p passes through an amplifier controller 410p, and then, is subjected to subtraction processing for the result obtained by subtraction of the levitation control current setting from the bias current setting amount. Further, the sensor carrier component (v×sin (ωcxt)) from the sensor carrier generation circuit 411 is subtracted from such a subtraction processing result, and then, the PWM control signal is generated in the PWM arithmetic unit 412p based on such a subtraction result. The gate signal generation unit 401p generates the gate drive voltage (the PWM gate signal) based on the PWM control signal generated in the PWM arithmetic unit 412p.

Similarly, an arithmetic result of the moving average arithmetic unit 409m passes through an amplifier controller 410m, and then, is subjected to subtraction processing for the result obtained by addition of the levitation control current setting to the bias current setting amount. Further, the sensor carrier component (v×sin (ωcxt)) from the sensor carrier generation circuit 411 is added to such a subtraction processing result, and then, the PWM control signal is generated in the PWM arithmetic unit 412m based on such an addition result. The gate signal generation unit 401m generates the gate drive voltage based on the PWM control signal generated in the PWM arithmetic unit 412m.

As described above, the magnetic bearing device of the present embodiment includes the pair of magnetic bearing electromagnets 45 provided for each of the multiple control axes and arranged to face each other with respect to the rotor shaft; the plurality of excitation amplifiers 43 configured to supply, to each magnetic bearing electromagnet 45, the electromagnet current on which the carrier signal for detecting a change in the levitation position of the rotor shaft is superimposed; the plurality of current sensors 101A, 101B configured to detect the electromagnet current to output the current detection signals Im, Ip; the addition unit 414 configured to add up the current detection signals Im, Ip for the pair of magnetic bearing electromagnets 45 to obtain the sum signal (Im+Ip); and the controller 44 configured to AD-sample the current detection signals Im, Ip and the sum signal (Im+Ip) in a predetermined AD sampling period (the zones (A), (B) of FIG. 8) to obtain the displacement information on the levitation position change, thereby performing PWM control of each excitation amplifier 43 based on the displacement information. When the duration of the current noise caused by PWM control of each excitation amplifier 43 is Td, the cycle of the PWM carrier signal is Tpwm, the on-duty upper limit of the PWM carrier signal under the quiet environment without disturbance is Tonu, and the on-duty lower limit of the PWM carrier signal under the quiet environment without disturbance is Tonl, the AD sampling period includes a first AD sampling period (the zone (A) of FIG. 8) between a point after a lapse of the time Td after the start of the cycle Tpwm and a point after a lapse of the time (Tpwm−Tonu) from the start of the cycle Tpwm, and a second AD sampling period (the zone (B) of FIG. 8) between a point after a lapse of the time (Tpwm−Tonl+Td) from the start of the cycle Tpwm and an end point of the cycle Tpwm.

With the above-described configuration, occurrence of vibration due to the switching noise influence can be prevented at least under the quiet environment. With the AD sampling period set as described above, the AD sampling points can be dispersedly arranged, and an AD converter configured to collectively take data is not necessarily used. Note that there is no limitation on duty fluctuation as in a typical case, and therefore, there is no probability that the duty variable range in PWM control is limited more than necessary.

Further, when the minimum intake time in AD sampling is Tmin, the sampling period in the off-duty zone may be, as in the zone (C) of FIG. 8, set to a period between the point after the lapse of the time Td from the start of the cycle Tpwm and a point after a lapse of the time (Td+Tmin) from the start of the cycle Tpwm, and the sampling period in the on-duty zone may be, as in the zone (D) of FIG. 8, set to a period between a point after a lapse of a time (Tpwm−Tmin) from the start of the cycle Tpwm and the end point of the cycle Tpwm.

For example, the sampling period is set to a period between a point after a lapse of 10% of the cycle Tpwm from the start of the cycle Tpwm and a point after a lapse of 40% of the cycle Tpwm from the start of the cycle Tpwm and a period between a point after a lapse of 70% of the cycle Tpwm from the start of the cycle Tpwm and a point after a lapse of 90% of the cycle Tpwm from the start of the cycle Tpwm. With the sampling period set as described above, occurrence of vibration of the bearing itself can be prevented not only under the quiet environment but also under environment with greater duty fluctuation.

Second Embodiment

In the above-described first embodiment, the sensorless (self-sensing) magnetic bearing turbo-molecular pump has been described, which is configured such that the sensor carrier signal is superimposed on the electromagnetic current and the sum signal (Ip+Im) of the current detection signals Ip, Im is utilized as the displacement signal. In a second embodiment, a magnetic bearing turbo-molecular pump will be described, which is configured such that displacement sensors are provided to detect displacement of a levitation position of a shaft 5.

Figure 13:
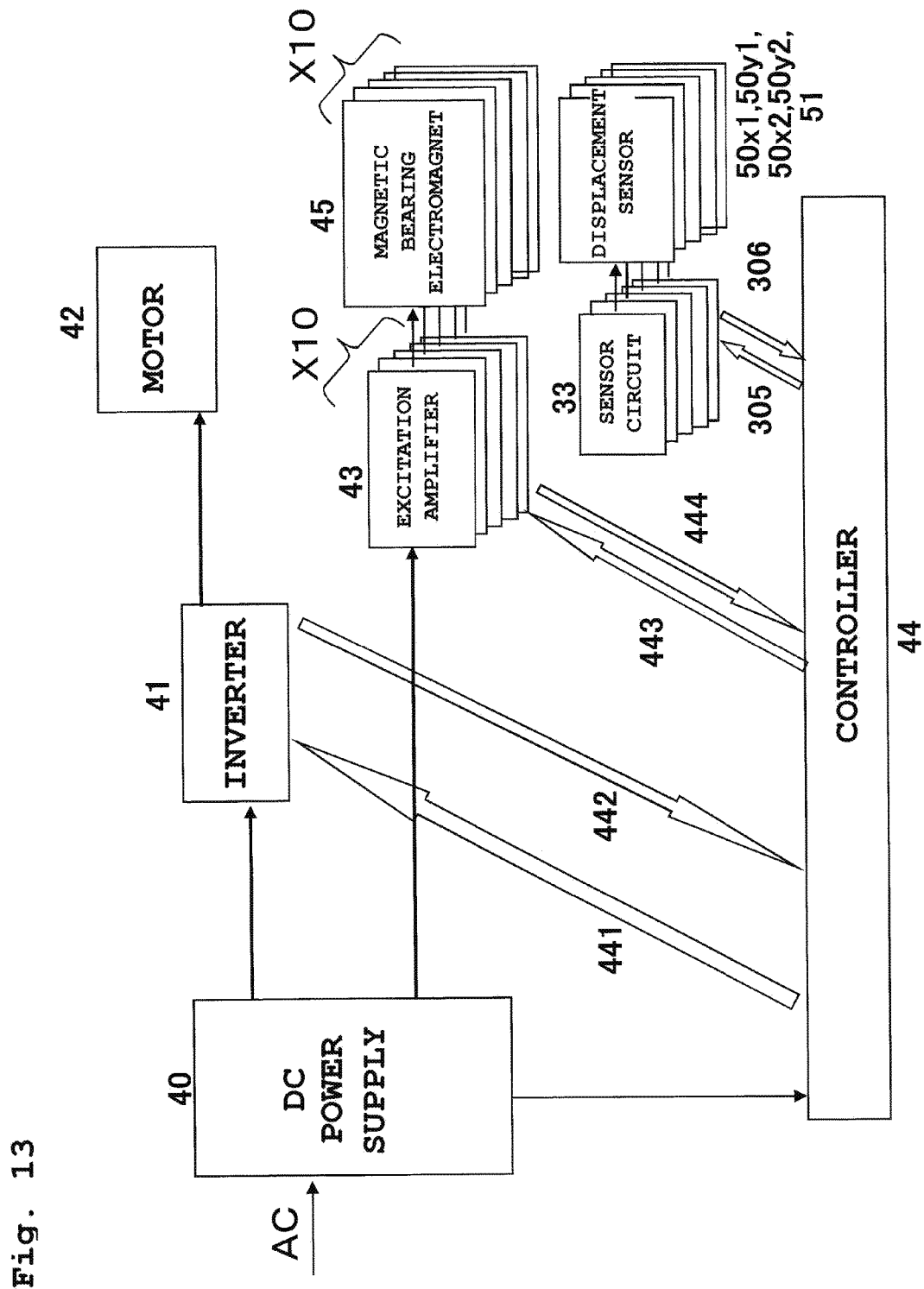
FIG. 13 is a block diagram of a control system in a second embodiment.

FIG. 13 is a block diagram of a control system, and corresponds to FIG. 2 described above. The same reference numerals as those of FIG. 2 are used to represent equivalent elements. As illustrated in FIG. 13, displacement sensors 50x1, 50y1, 50x2, 50y2, 51 are provided at a pump main body. The displacement sensors 50x1, 50y1 are provided corresponding to two axes of a radial magnetic bearing 67 (see FIG. 1). The displacement sensors 50x2, 50y2 are provided corresponding to two axes of a radial magnetic bearing 68 (see FIG. 1). The displacement sensors 51 are provided corresponding to an axial magnetic bearing 69 (a single axis). As in the case of electromagnets, the displacement sensors are configured as a pair of sensors for each axis.

Each of the displacement sensors 50x1, 50y1, 50x2, 50y2, 51 is provided with a sensor circuit 33. A sensor carrier signal (a carrier signal) 305 is input from a controller 44 to each sensor circuit 33. A sensor signal 306 modulated by displacement is input from each sensor circuit 33 to the controller 44. Other configurations are similar to those illustrated in FIG. 2, and therefore, description thereof will not be repeated.

Figure 14:
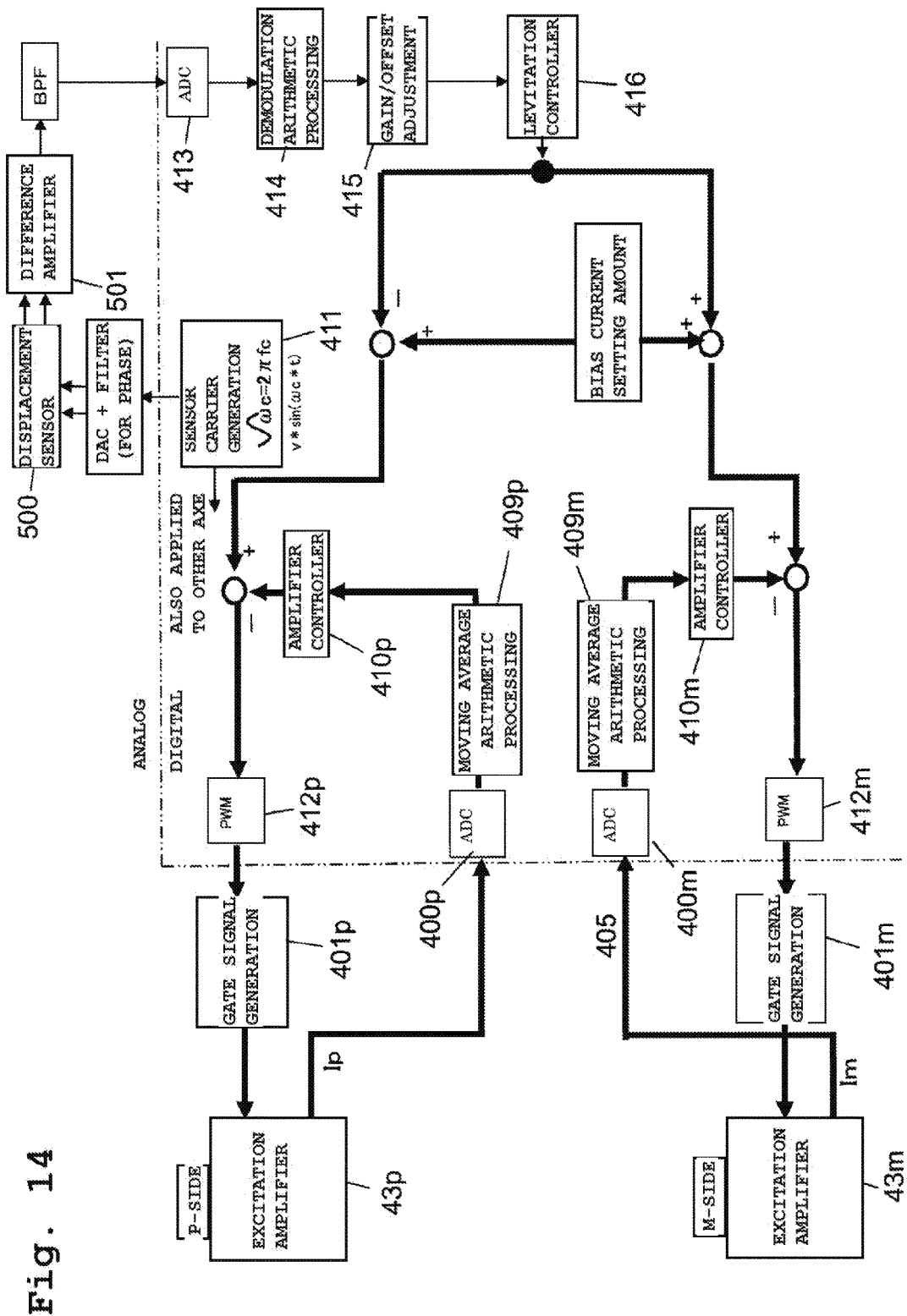
FIG. 14 is a functional block diagram in magnetic bearing control in the case of providing displacement sensors.

FIG. 14 is a functional block diagram in magnetic bearing control in the case of providing the displacement sensors. As in the case of FIG. 12 described above, FIG. 14 illustrates one of five control axes. A sensor carrier signal (a digital signal) generated in a sensor carrier generation circuit 411 is converted from the digital signal into an analog signal, and then, is applied to a pair of displacement sensors 50 (e.g., a pair of displacement sensors 50x1) via a phase adjustment filter circuit. A differential signal is, by a difference amplifier 501, obtained from the sensor signal modulated by the displacement sensors 500. After bandpass filter processing of the differential signal, the resultant is AD-sampled by an AD converter 413.

In a demodulation arithmetic unit 406, demodulation arithmetic processing is performed based on sampling data. Further, gain adjustment and offset adjustment are performed for the demodulated signal (a gain/offset adjustment unit 415). In a magnetic levitation controller 416, a levitation control current setting is, based on the signal (displacement information) output from the gain/offset adjustment unit 415, generated by proportional control, integral control, derivative control, phase correction, etc. As in the case of FIG. 12, a result obtained by subtraction of the levitation control current setting from a bias current setting amount is used for P-side control, and a result obtained by addition of the levitation control current setting to the bias current setting amount is used for M-side control.

Figure 15:
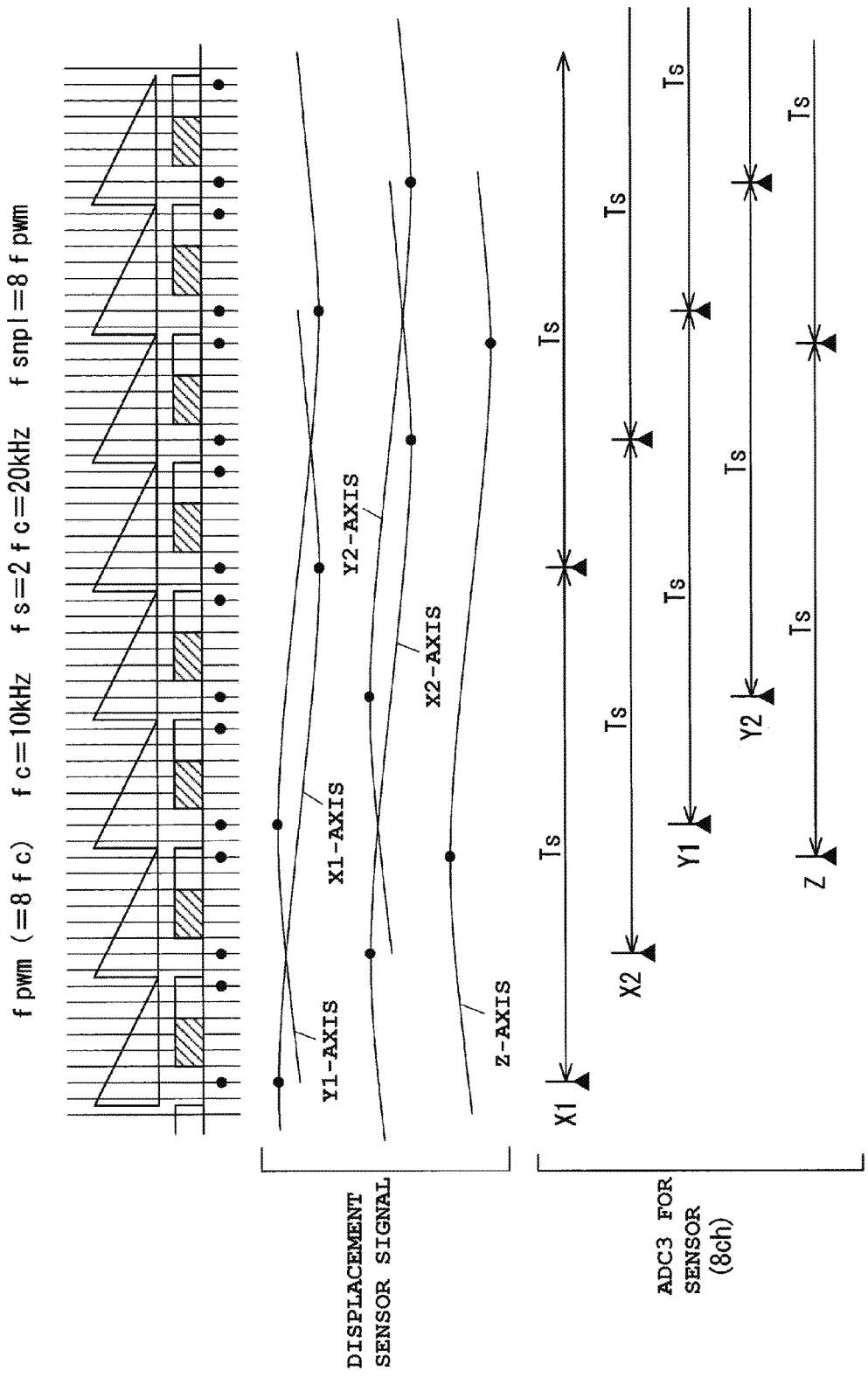
FIG. 15 is a chart of sampling timing of each displacement sensor.

FIG. 15 is a chart of sampling timing in a case where the signals from the displacement sensors are AD-sampled in the AD converter 413. A sensor carrier frequency fc is 10 kHz, and a PWM frequency fpwm and a sampling frequency fs are set to an integral multiple relationship such as fpwm=8fc and fs=2fc. Moreover, a cycle Tsnpl as described above is set to a cycle obtained by division of a PWM cycle Tpwm by eight. Note that AD sampling similar to that of FIG. 10 is performed for current detection signals (lx1p, lx1m, ly1p, ly1m, lx2p, lx2m, ly2p, ly2m, lzp, lzm).

The sensor signals shown in a middle section of FIG. 15 show signals (signals after differential processing) for five axes, the signals being input to the AD converter 413. The signals for an X1 axis and a Y1 axis are sensor signals corresponding to the displacement sensors 50x1, 50y1, the signals for an X2 axis and a Y2 axis are sensor signals corresponding to the displacement sensors 50x2, 50y2, and the signal for a Z-axis is a sensor signal corresponding to the displacement sensors 51.

There are 16 sampling points (black circles) in a cycle Tc, and the points of AD sampling for the five axes (X1, Y1, X2, Y2, Z) in ADC1 (the AD converter 413) are dispersedly arranged at any of these 16 points. For example, AD sampling is, for the sensor signal X1, performed at the first sampling timing from the left and the sampling timing apart from the first sampling timing by Ts, 2 Ts, . . . . Moreover, AD sampling is, for the sensor signal Y1, performed at the fifth sampling timing from the left and the sampling timing apart from the fifth sampling timing by Ts, 2 Ts, . . . .

Figure 16:
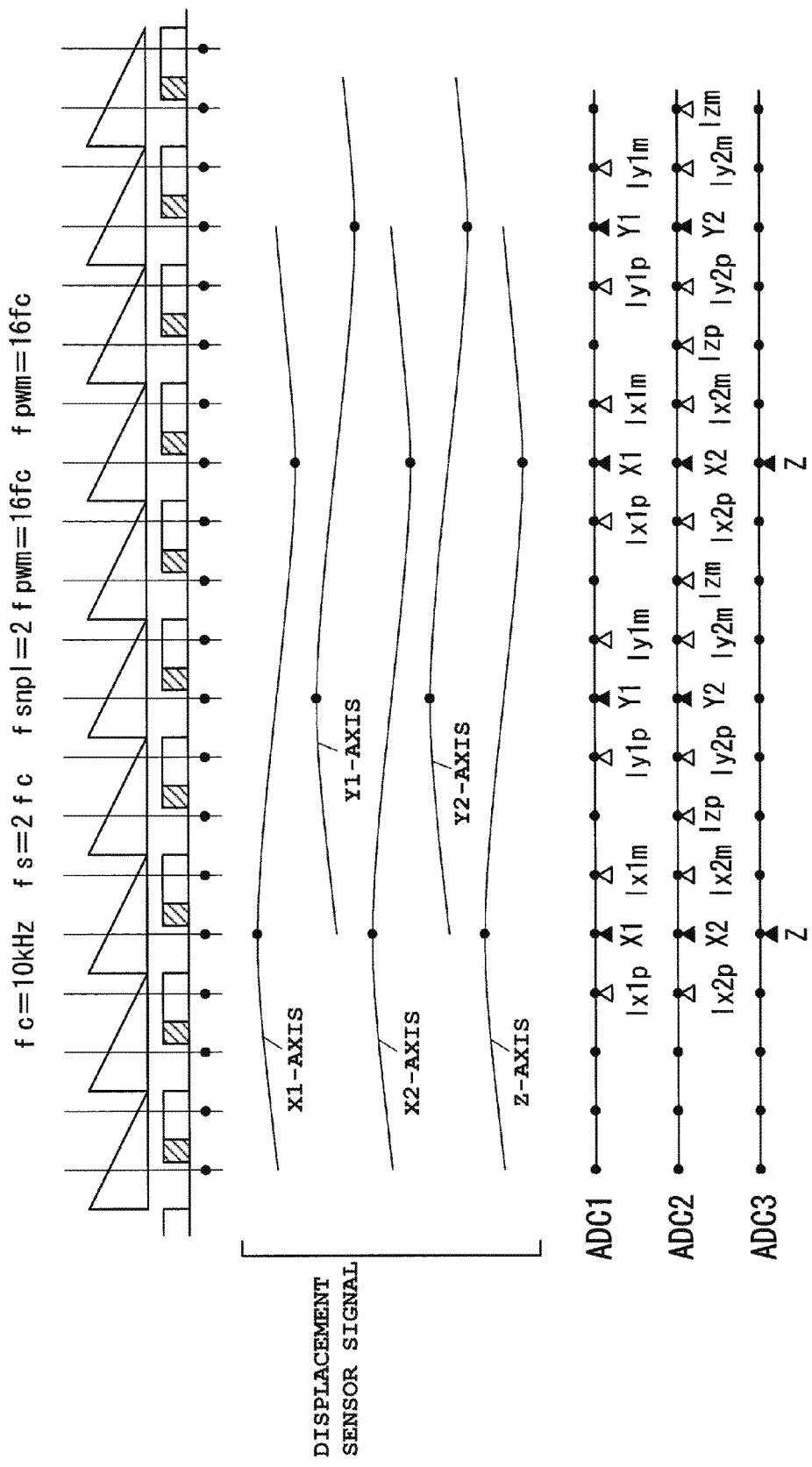
FIG. 16 is a chart of sampling timing.

FIG. 16 shows a case where the sensor carrier frequency is set to fc=10 kHz, fpwm=8fc=80 kHz, fs=2fc=20 kHz and the cycle Tsnpl is set to Tpwm=2·Tsnpl. Eight-channel AD converters are used as three AD converters ADC1, ADC2, ADC3. In the AD converter ADC1, the displacement sensor signals X1, Y1 and the current detection signals lx1p, lx1m, ly1p, ly1m are sampled. In the AD converter ADC2, the displacement sensor signals X2, Y2 and the current detection signals lx2p, lx2m, ly2p, ly2m are sampled. In the AD converter ADC3, the displacement sensor signal Z is sampled.

The magnetic bearing device of the second embodiment includes the pair of magnetic bearing electromagnets 45 provided for each of the multiple control axes and arranged to face each other with respect to the rotor shaft; the plurality of excitation amplifiers 43 configured to supply, to each magnetic bearing electromagnet 45, electromagnet current for generating suction power between each magnetic bearing electromagnet 45 and the rotor shaft; the plurality of current sensors 101A, 101B configured to detect the electromagnet current to output the current detection signals Im, Ip; the controller 44 configured to generate the carrier signal (the PWM carrier signal) for detecting a change in the levitation position of the rotor shaft; and the displacement sensors 50x1, 50y1, 50x2, 50y2, 51 configured to modulate the PWM carrier signal based on the levitation position change to output the modulated signal. The controller 44 AD-samples the current detection signals Im, Ip and the modulated signal in a predetermined AD sampling period (zones (A) and (B) of FIG. 8) to obtain the displacement information on the levitation position change, thereby performing PWM control of each excitation amplifier 43 based on the displacement information. When the duration of current noise caused by PWM control of each excitation amplifier 43 is Td, the cycle of the PWM carrier signal is Tpwm, an on-duty upper limit of the PWM carrier signal under quiet environment without disturbance is Tonu, and an on-duty lower limit of the PWM carrier signal under the quiet environment without disturbance is Tonl, the AD sampling period includes a first AD sampling period (the zone (A) of FIG. 8) between a point after a lapse of a time Td after the start of the cycle Tpwm and a point after a lapse of a time (Tpwm−Tonu) from the start of the cycle Tpwm, and a second AD sampling period (the zone (B) of FIG. 8) between a point after a lapse of a time (Tpwm−Tonl+Td) from the start of the cycle Tpwm and an end point of the cycle Tpwm.

Thus, even in the magnetic bearing device configured such that the special displacement sensors are provided as in the second embodiment, features and advantageous effects similar to those of the first embodiment can be also provided.

Further, a sampling period in an off-duty zone may be, as in a zone (C) of FIG. 8, set to a period between a point after the lapse of the time Td from the start of the cycle Tpwm and a point after a lapse of a time (Td+Tmin) from the start of the cycle Tpwm, and a sampling period in an on-duty zone may be, as in an interval (D) of FIG. 8, set to a period between a point after a lapse of a time (Tpwm−Tmin) from the start of the cycle Tpwm and the end point of the cycle Tpwm.

Moreover, as in the case of the first embodiment, the sampling period is set to a period between a point after a lapse of 10% of the cycle Tpwm and a point after a lapse of 40% of the cycle Tpwm and to a period between a point after a lapse of 70% of the cycle Tpwm and a point after a lapse of 90% of the cycle Tpwm. With this configuration, occurrence of vibration of the bearing itself can be prevented not only under the quiet environment but also under environment with greater duty fluctuation.

Third Embodiment

Figure 17:
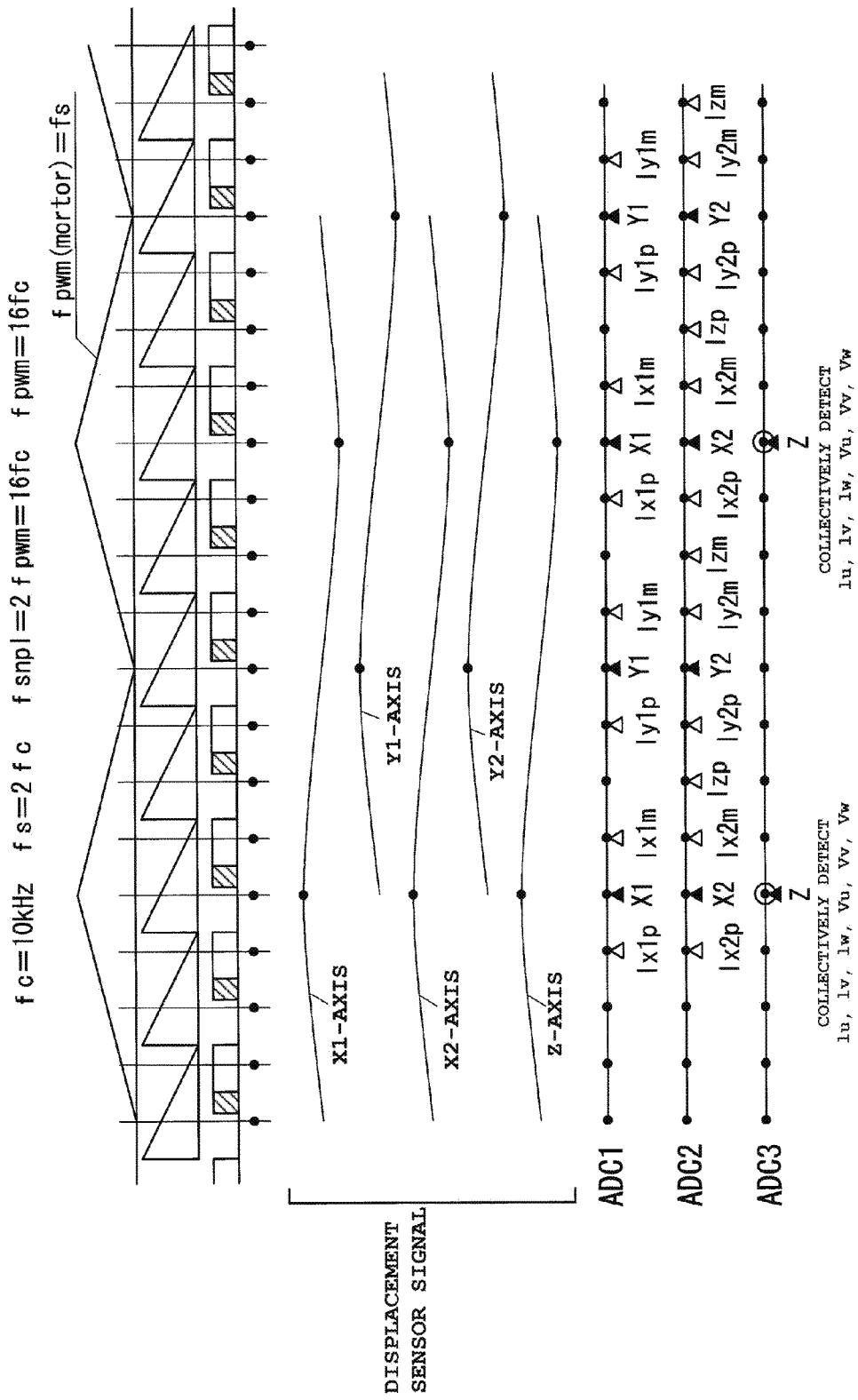
FIG. 17 is a chart for describing a third embodiment of the present invention.

FIG. 17 is a chart for describing a third embodiment of the present invention. As described above, PWM control is also used for driving control of a motor 42. The motor 42 is driven with power higher than that of a magnetic bearing. The present embodiment aims to prevent superimposing of switching noise of a motor drive system on a magnetic bearing control system, specifically a displacement signal, via a GND line. In the present embodiment, displacement sensors are used for the magnetic bearing as in the second embodiment.

FIG. 17 shows an example of AD sampling. In the present embodiment, the magnetic bearing control system is set to fs=2·fc=20 kHz, fpwm=8·fc, and fsnpl=2·fpwm, and a PWM carrier signal frequency fpwm (motor) of the motor drive system is set to fpwm (motor)=2·fc=fs. The PWM switching timing of the motor drive system is between upper and lower peaks of a PWM carrier of FIG. 17, and such a position varies according to an output status. Thus, motor phase currents (Iu, Iv, Iw) and motor phase voltages (Vu, Vv, Vw) required for driving control are detected at points avoiding such switching timing in the vicinity of the upper and lower peaks of the PWM carrier. Similarly, AD sampling timing is also set for signals relating to the magnetic bearing for the purpose of avoiding influence of noise of the high-power motor drive system. Note that in the case of a sensorless (self-sensing) configuration, displacement signals of the special displacement sensors may be replaced with sum-signals as described above.

Note that in each embodiment described above, when great disturbance leading to an on-duty duration of equal to or shorter than (Td+Tmin) or equal to or longer than (Tpwm−Td−Tmin) in a PWM carrier signal is caused, there is a probability that noise constantly influences the sensor signals and the current detection signals, resulting in unstable magnetic bearing control. For this reason, in the controller 44, the frequency (the number of times per predetermined time) of reaching a PWM carrier signal on-duty duration of equal to or shorter than (Td+Tmin) or equal to or longer than (Tpwm−Td−Tmin) may be measured, and when the frequency exceeds a predetermined frequency threshold, a warning signal may be output. For example, a display device is provided at the control unit, and when the warning signal is output, a warning is displayed on the display device. Alternatively, it may be configured such that the warning signal is output from the control unit to the outside. For example, a rough indication of 2σ (about 10%) in normal distribution may be used as the frequency threshold.

Alternatively, multiple different frequency thresholds may be held in the controller 44, and any one of the multiple frequency thresholds may be selected according to a pump use condition. For example, in a case where a device strict about vibration, such as an electron microscope, is equipped with a pump, a lower frequency threshold is set.

Note that description has been made above merely as an example, and the above-described embodiments do not limit the present invention as long as the features of the present invention are not impaired. For example, even in the case of an inverse logic of ON/OFF of the PWM control signal shown in FIG. 7, the present invention can be similarly applied with each on-duty time of FIG. 7 being replaced with an off-duty time. Moreover, the magnetic bearing device provided at the turbo-molecular pump has been described as an example in the above-described embodiments. However, the present invention is not limited to the turbo-molecular pump, and is similarly applicable to magnetic bearing devices for various rotary pumps and magnetic bearing devices for other devices than the pump.

What is claimed is:

1. A magnetic bearing device comprising:
   a pair of electromagnets provided for each of multiple control axes and arranged to face each other with respect to a rotor shaft;
   a plurality of excitation amplifiers configured to supply an electromagnet current to each electromagnet;
   a plurality of current sensors each configured to detect the electromagnet current to output a current detection signal; and
   a controller configured to AD-sample (i) the current detection signal based on the electromagnet current on which a carrier signal for detecting a change in a levitation position of the rotor shaft is superimposed, and a sum signal of the current detection signals of the pair of electromagnets, or (ii) the current detection signal, and a modulated signal produced by modulating a carrier signal based on the levitation position, in a predetermined AD sampling period to obtain displacement information on the levitation position change, thereby performing PWM control of each excitation amplifier based on the displacement information,
   wherein when a duration of current noise caused by the PWM control of each excitation amplifier is Td, a cycle of a PWM carrier signal is Tpwm, an on-duty upper limit of the PWM carrier signal under quiet environment without disturbance is Tonu, and an on-duty lower limit of the PWM carrier signal under the quiet environment without the disturbance is Tonl, the AD sampling period includes
      a first AD sampling period between a point after a lapse of the time Td after a start of the cycle Tpwm and a point after a lapse of a time (Tpwm−Tonu) from the start of the cycle Tpwm, and
      a second AD sampling period between a point after a lapse of a time (Tpwm−Tonl+Td) from the start of the cycle Tpwm and an end point of the cycle Tpwm.

2. The magnetic bearing device according to claim 1, further comprising
   a carrier generator configured to generate the carrier signal for detecting the change in the levitation position of the rotor shaft; and
   a displacement sensor configured to modulate the carrier signal based on the levitation position change to output the modulated signal; wherein
   the controller AD-samples each current detection signal and the modulated signal in the predetermined AD sampling period to obtain displacement information on the levitation position change, thereby performing PWM control of each excitation amplifier based on the displacement information.

3. The magnetic bearing device according to claim 1, wherein the plurality of excitation amplifiers supply, to each electromagnet, the electromagnet current on which the carrier signal for detecting the change in the levitation position of the rotor shaft is superimposed;

the magnetic bearing device further comprising the sum signal obtainer configured to add up the current detection signals of the pair of electromagnets to obtain the sum signal, wherein the controller AD-samples each current detection signal and the sum signal in the predetermined AD sampling period to obtain displacement information on the levitation position change, thereby performing PWM control of each excitation amplifier based on the displacement information.

4. The magnetic bearing device according to claim 1, wherein when a minimum intake time in AD sampling is Tmin,
the first AD sampling period is set to a period between the point after the lapse of the time Td from the start of the cycle Tpwm and a point after a lapse of a time (Td+Tmin) from the start of the cycle Tpwm, and the second AD sampling period is set to a period between a point after a lapse of a time (Tpwm−Tmin) from the start of the cycle Tpwm and the end point of the cycle Tpwm.

5. The magnetic bearing device according to claim 1, wherein the first AD sampling period is set to a period between a point after a lapse of 10% of the cycle Tpwm from the start of the cycle Tpwm and a point after a lapse of 40% of the cycle Tpwm from the start of the cycle Tpwm, and the second AD sampling period is set to a period between a point after a lapse of 70% of the cycle Tpwm from the start of the cycle Tpwm and a point after a lapse of 90% of the cycle Tpwm from the start of the cycle Tpwm.

6. The magnetic bearing device according to claim 1, wherein when a frequency of the PWM carrier signal is fpwm, a frequency of the carrier signal is fc, and a frequency in the AD sampling is fs, the fpwm, the fc, and the fs satisfy fpwm=M·fs=N·fc in relation to integers M, and satisfying N≥M>1, and sampling timing for performing the AD sampling is set at every time interval Tsnpl being equal to or shorter than the time (Td+Tmin) and satisfying Tpwm=L·Tsnpl in relation to an integer L.

7. The magnetic bearing device according to claim 1, further comprising:

an obtainer configured to obtain such a frequency that an on-duty duration in the PWM carrier signal is equal to or shorter than (Td+Tmin) or equal to or longer than (Tpwm−Td−Tmin); and a warner configured to emit a warning when the frequency exceeds a predetermined frequency threshold.

8. The magnetic bearing device according to claim 7, further comprising:

a holder configured to hold multiple different frequency thresholds, wherein any of the multiple frequency thresholds is alternatively set.

* * * * *